United States Patent
Shinohara

(10) Patent No.: US 12,463,931 B2
(45) Date of Patent: Nov. 4, 2025

(54) STORAGE MEDIUM THAT STORES PROGRAM THAT ALLOWS SENDER TO KNOW WHETHER OR NOT CONTENT OF SENT PLAYBACK-TYPE MESSAGE HAS BEEN CONVEYED TO RECIPIENT, CONTROL METHOD FOR INFORMATION PROCESSING APPARATUS, AND INFORMATION PROCESSING APPARATUS

(71) Applicant: CANON KABUSHIKI KAISHA, Tokyo (JP)

(72) Inventor: Taku Shinohara, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/589,520

(22) Filed: Feb. 28, 2024

(65) Prior Publication Data
US 2024/0297865 A1 Sep. 5, 2024

(30) Foreign Application Priority Data
Mar. 1, 2023 (JP) .................................. 2023-030946

(51) Int. Cl.
*G06F 15/16* (2006.01)
*H04L 51/224* (2022.01)

(52) U.S. Cl.
CPC ................................. *H04L 51/224* (2022.05)

(58) Field of Classification Search
CPC ...... H04L 51/224; H04L 51/04; H04L 51/046
See application file for complete search history.

(56) References Cited

U.S. PATENT DOCUMENTS

| | | | |
|---|---|---|---|
| 10,608,978 B2 * | 3/2020 | Koum | G06F 3/04842 |
| 2012/0231770 A1 * | 9/2012 | Clarke | H04W 4/12 |
| | | | 455/414.1 |
| 2019/0028417 A1 | 1/2019 | Lee | |

FOREIGN PATENT DOCUMENTS

JP 2017174202 A 9/2017

* cited by examiner

*Primary Examiner* — John B Walsh
(74) *Attorney, Agent, or Firm* — ROSSI, KIMMS & McDOWELL LLP

(57) ABSTRACT

A storage medium storing a program for causing an information processing apparatus to execute a process that transmits data of a message displayed on a terminal of a conversation partner who uses a chat room. The program includes software code adapted to perform causing the information processing apparatus to display a chat screen of the chat room, causing to transmit data for playing back a playback-type message, causing the chat screen to display a first notification indicating that an object for issuing an instruction to play back the playback-type message has been displayed on the terminal of the conversation partner, when the playback-type message has been played back by the terminal of the conversation partner, causing to receive information indicating the playback-type message, and causing the chat screen to display a second notification indicating that the playback-type message has been played back, based on the information indicating the playback-type message.

11 Claims, 27 Drawing Sheets

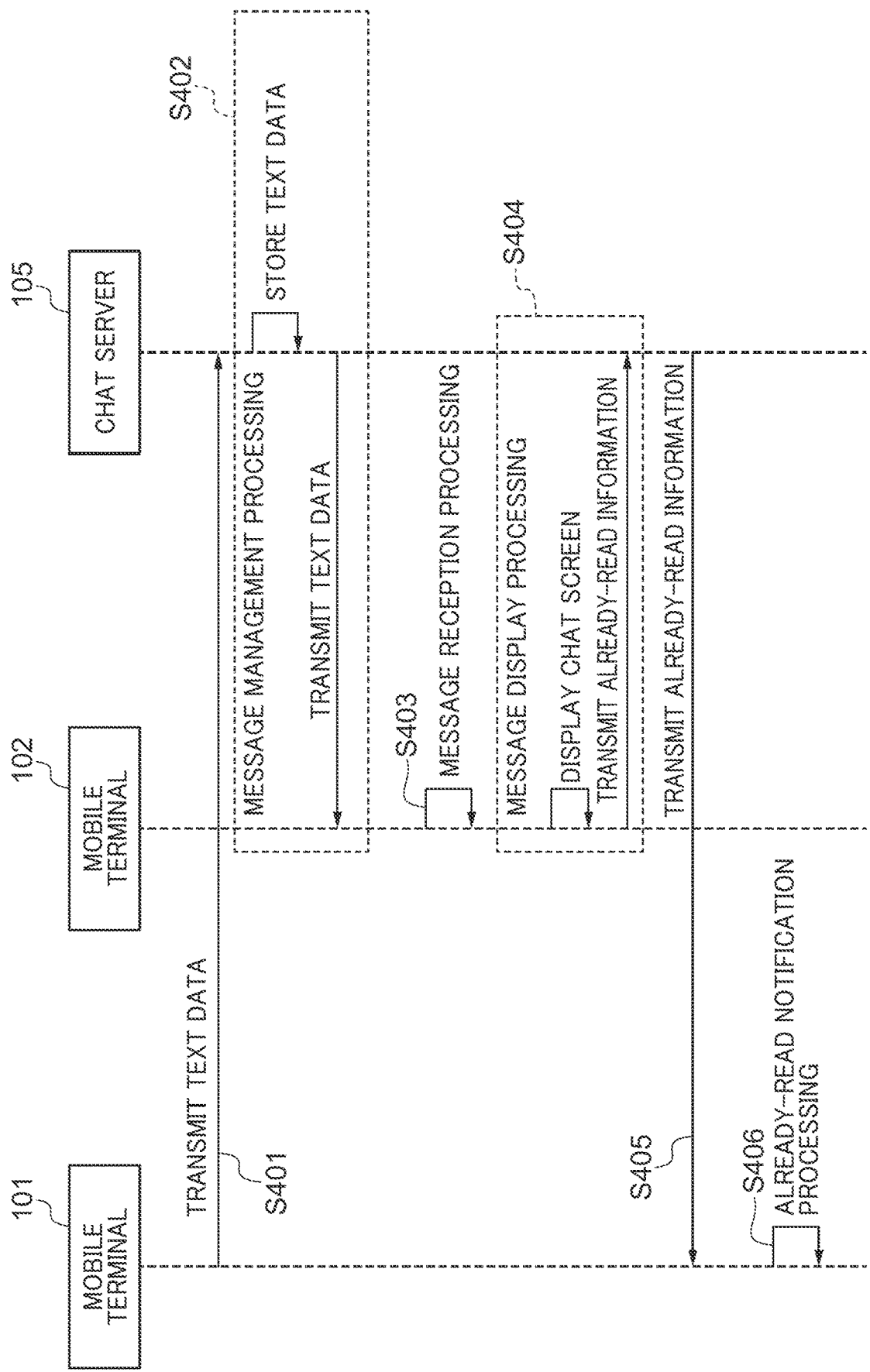

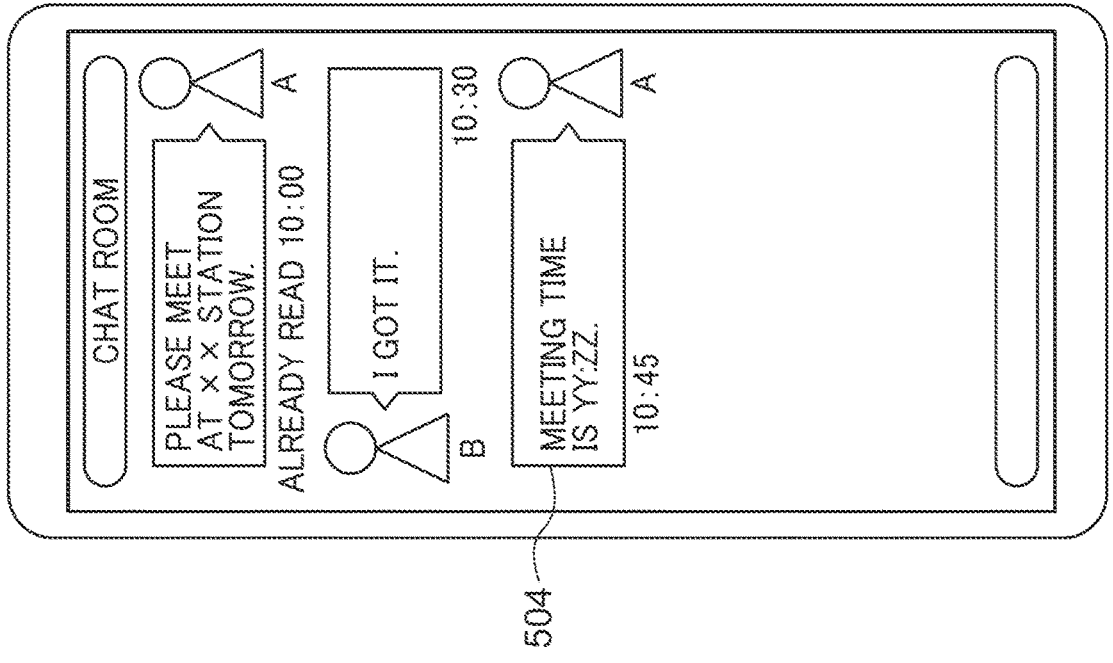
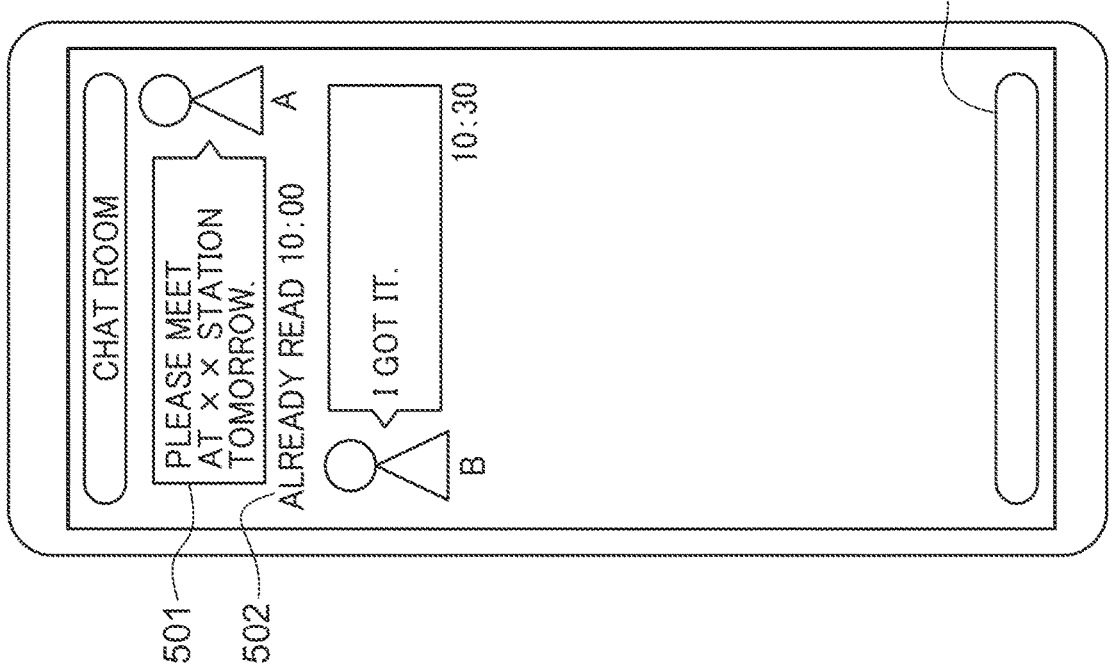

*FIG. 9*

| CHAT ROOM ID | ALREADY-READ INFORMATION |
|---|---|
| A | 100 |
| B | 50 |
| C | 30 |

FIG. 23

| CHAT ROOM ID | ALREADY-READ INFORMATION | VOICE MESSAGE ID | VOICE MESSAGE SENDING USER | USER WHO HAS ALREADY PLAYED BACK VOICE MESSAGE |
|---|---|---|---|---|
| A | 100 | 1 | D | A, B, C |
| | | 2 | B | A |
| | | 3 | A | C, D |
| | | 4 | D | A, B, C |

STORAGE MEDIUM THAT STORES
PROGRAM THAT ALLOWS SENDER TO
KNOW WHETHER OR NOT CONTENT OF
SENT PLAYBACK-TYPE MESSAGE HAS
BEEN CONVEYED TO RECIPIENT,
CONTROL METHOD FOR INFORMATION
PROCESSING APPARATUS, AND
INFORMATION PROCESSING APPARATUS

BACKGROUND OF THE INVENTION

Field of the Invention

The present invention relates to a storage medium that stores a program, a control method for an information processing apparatus, and an information processing apparatus.

Description of the Related Art

In recent years, communication between users using a chat system has become widespread. In such a chat system, a service is known in which the communication is performed by sending not only a text message but also a playback-type message such as a voice messages or a moving image message (a video message) and the receiving side playing back the playback-type message.

In such a chat system, a mechanism, which, when a message sent from a terminal of a sender is displayed on a terminal of a recipient, causes to display an already-read notification, which indicating that this message has been displayed, on the terminal of the sender, is known (see Japanese Laid-Open Patent Publication (kokai) No. 2017-174202). As a result, the sender is able to easily know whether or not the content of the sent message has been conveyed to the recipient.

In the case that the sent message is a text message, by causing to display this text message on the terminal of the recipient, the recipient is able to know the content of the sent message. However, in the case that the sent message is a playback-type message, if this playback-type message is not played back, the recipient will not know the content of the sent message. For this reason, with the conventional configuration that causes to display the already-read notification on the terminal of the sender when a playback button for the playback-type message is displayed on the terminal of the recipient, the sender is not able to know from this already-read notification whether or not the content of the sent playback-type message has been conveyed to the recipient.

SUMMARY OF THE INVENTION

The present invention provides a storage medium that stores a program that allows a sender to know whether or not the content of a sent playback-type message has been conveyed to a recipient, a control method for an information processing apparatus, and an information processing apparatus.

Accordingly, the present invention provides a non-transitory computer-readable storage medium storing a program for causing an information processing apparatus to execute a process that transmits data of a message displayed on a terminal of a conversation partner who uses a chat room, the program comprising software code adapted to perform causing the information processing apparatus to display a chat screen of the chat room, causing the information processing apparatus to transmit data for playing back a playback-type message, causing the chat screen to display a first notification indicating that an object for issuing an instruction to play back the playback-type message has been displayed on the terminal of the conversation partner, when the playback-type message has been played back by the terminal of the conversation partner, causing the information processing apparatus to receive information indicating the playback-type message, and causing the chat screen to display a second notification, which indicates that the playback-type message has been played back, based on the information indicating the playback-type message.

According to the present invention, it is possible to for the sender to know whether or not the content of the sent playback-type message has been conveyed to the recipient.

Further features of the present invention will become apparent from the following description of exemplary embodiments with reference to the attached drawings.

BRIEF DESCRIPTION OF THE DRAWINGS

FIG. 4 is a sequence diagram that shows a procedure of a text message communication processing performed in the chat system in the preferred embodiment of the present invention.

FIGS. 5A and 5B are diagrams that show an example of a chat screen displayed on a display unit of a mobile terminal on a sending side.

FIG. 9 is a diagram that shows an example of a management table managed by the mobile terminal on the sending side.

FIG. 23 is a diagram that shows an example of a playback user management table managed by the chat server shown in FIG. 1.

DESCRIPTION OF THE EMBODIMENTS

The present invention will now be described in detail below with reference to the accompanying drawings showing embodiments thereof.

Hereinafter, a preferred embodiment of the present invention will be described in detail with reference to the accompanying drawings. It should be noted that the following preferred embodiment does not limit the present invention according to the claims, and not all combinations of features described in the following preferred embodiment are essential to means of the present invention for solving the conventional problem.

Figure 1:
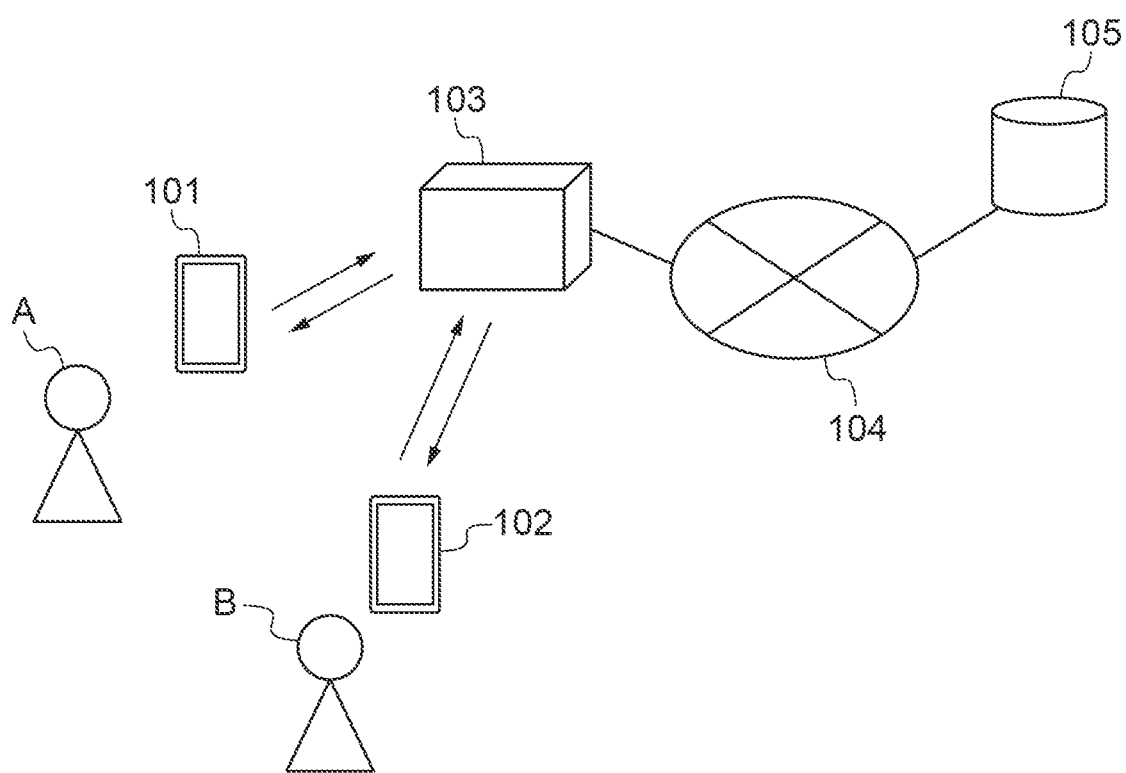
FIG. 1 is a diagram that shows an example of a configuration of a chat system including an information processing apparatus according to a preferred embodiment of the present invention.

FIG. 1 is a diagram that shows an example of a configuration of a chat system including an information processing apparatus according to the preferred embodiment of the present invention. This chat system provides a chat service that realizes real-time communication by using information processing apparatuses such as smartphones, tablet terminals, and personal computers (PCs). In this chat system, data communications of text messages and playback-type messages are performed one person to one person or one person to multiple people. The playback-type message is, for example, a voice message (an audio message) including audio, or a moving image message (a video message) including audio and video. It should be noted that in the preferred embodiment of the present invention, as an example, a case will be described in which a user A and a user B use this chat system to perform one-on-one real-time communication. In the preferred embodiment of the present invention, it is assumed that the user A uses a mobile terminal 101 that is an example of the information processing apparatus and the user B uses a mobile terminal 102 that is an example of the information processing apparatus. It should be noted that in the preferred embodiment of the present invention, a mobile terminal will be described as an example of the information processing apparatus, but the information processing apparatus is not limited to a mobile terminal, and may be another device having a communication function.

In this chat system, the mobile terminal 101 and the mobile terminal 102 communicate with a chat server 105 via a communication base station 103 and the Internet 104. For example, when the user A sends data of a playback-type message by using a chat application on the mobile terminal 101, the data of the playback-type message is transmitted to the chat server 105 via the communication base station 103 and the Internet 104. After that, the data of the playback-type message is transmitted from the chat server 105 to the mobile terminal 102 of the user B who is a conversation partner (a chat partner) via the Internet 104 and the communication base station 103.

Figure 2:
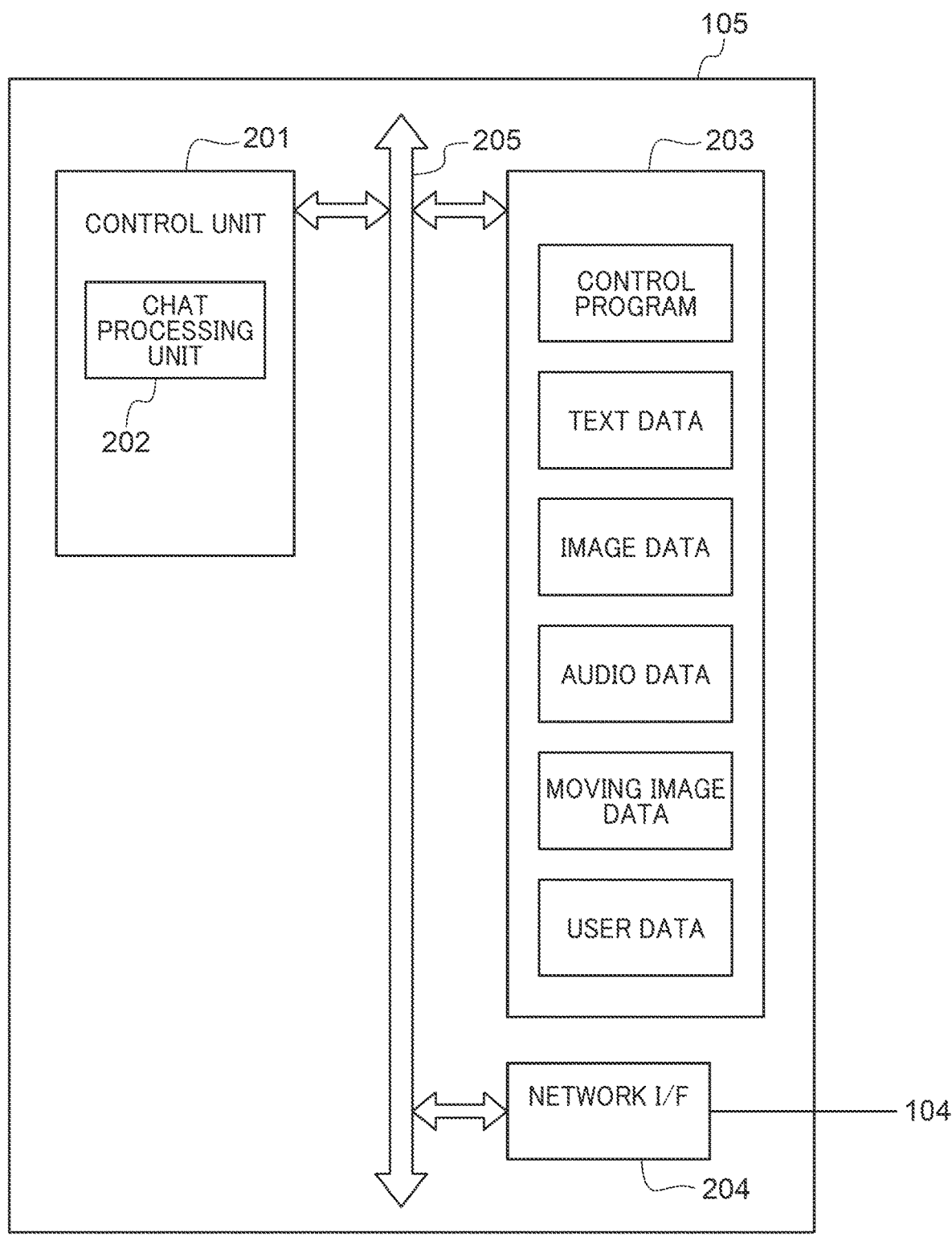
FIG. 2 is a block diagram that schematically shows a configuration of a chat server shown in FIG. 1.

FIG. 2 is a block diagram that schematically shows a configuration of the chat server 5 shown in FIG. 1. As shown in FIG. 2, the chat server 105 includes a control unit 201, a storage unit 203, and a network interface (a network I/F) 204. The control unit 201, the storage unit 203, and the network I/F 204 are connected to each other via a system bus 205.

The control unit 201 comprehensively controls respective devices connected via the system bus 205 by executing a control program stored in the storage unit 203. The control unit 201 includes one or a plurality of central processing units (CPUs), or the like. In addition, the control unit 201 includes a chat processing unit 202. The chat processing unit 202 interprets data of the message received from the chat application, which is installed on the mobile terminal 101 or the like, and responds. In this way, the chat server 105 has an automatic dialogue function and also functions as a chatbot.

The storage unit 203 is configured by a hard disk drive (an HDD), a solid state drive (an SSD), a random access memory (a RAM), a read only memory (a ROM), etc., and is used as an internal storage of the chat server 105. The storage unit 203 stores the control program, text data, image data, audio data, moving image data, user data, etc. The text data is text data corresponding to text messages posted on the chat. The image data is image data posted on the chat. The audio data is audio data for playing back voice messages (audio messages) posted on the chat. The moving image data is moving image data for playing back moving image messages (video messages) posted on chat. The user data is a list of combinations of user IDs and passwords that are required when users log in to the chat application. The network I/F 204 is hardware that is connected to the Internet 104 via a LAN cable or the like to perform network communication.

Figure 3A:
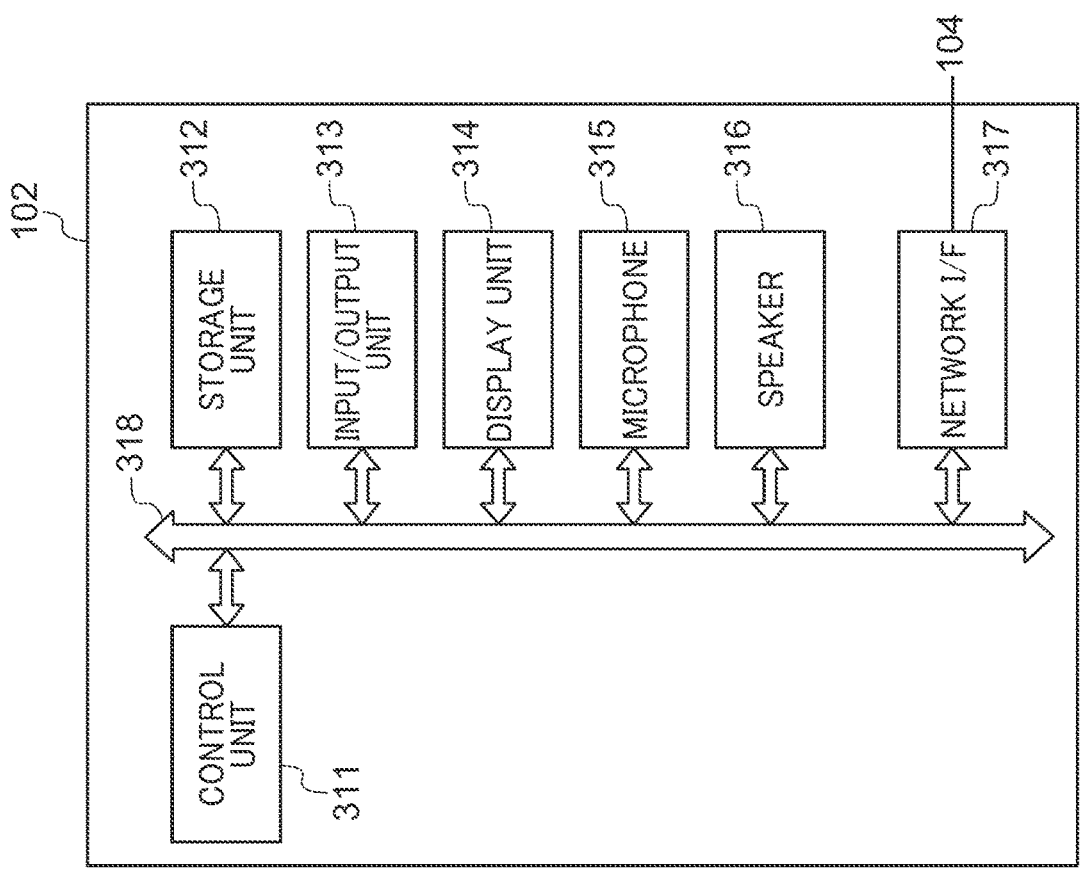
FIGS. 3A and 3B are block diagrams that schematically show configurations of mobile terminals shown in FIG. 1.

FIG. 3A is a block diagram that schematically shows a configuration of the mobile terminal 101 shown in FIG. 1. As shown in FIG. 3A, the mobile terminal 101 includes a control unit 301, a storage unit 302, an input/output unit 303, a display unit 304, a microphone 305, a speaker 306, and a network I/F 307. The control unit 301, the storage unit 302, the input/output unit 303, the display unit 304, the microphone 305, the speaker 306, and the network I/F 307 are connected to each other via a bus 308.

The control unit 301 comprehensively controls respective devices connected via the bus 308 by executing a control program stored in the storage unit 302. The control unit 301 includes one or a plurality of CPUs, or the like. The storage unit 302 is configured by an HDD, an SSD, a RAM, a ROM, etc., and is used as an internal storage of the mobile terminal 101. The storage unit 302 stores text data, audio data, image data, system software, etc.

The input/output unit 303 includes, for example, an LCD touch panel, etc., and transmits information, which indicates the content of the user's operation on the input/output unit 303, to the control unit 301. The method for detecting the operation of the touch panel may be a general detection method such as a resistive film method, an infrared method, an electromagnetic induction method, or a capacitance method. It should be noted that the input of various kinds of instructions by the user may be realized by using a hardware input device such as a switch or a keyboard.

The display unit 304 provides a user interface (a UI). The display unit 304 displays, for example, a chat screen to be described below or a login screen for logging in to the chat application. In the preferred embodiment of the present invention, when the user A enters (inputs) a user ID and a password on the login screen displayed on the display unit 304 of the mobile terminal 101, the mobile terminal 101 transmits the user ID and the password to the chat server 105. The chat server 105 performs user authentication based on the received user ID and the received password, and in the case that the user authentication is successful, transmits a notification, which indicates that the user authentication has been successful, to the mobile terminal 101. When the mobile terminal 101 receives the notification, which indicates that the user authentication has been successful, the mobile terminal 101 logs in to the chat application, and the chat screen to be described below is displayed on the display unit 304.

The microphone 305 is used to input audio. The speaker 306 is used to output audio. It should be noted that in the preferred embodiment of the present invention, although a configuration in which audio is outputted from the speaker 306 built into the mobile terminal 101 will be described, a configuration in which audio is outputted from an audio output device such as an earphone or a speaker connected to the mobile terminal 101 may also be used. The network I/F 307 is connected to the Internet 104 to perform network communication.

Figure 3B:
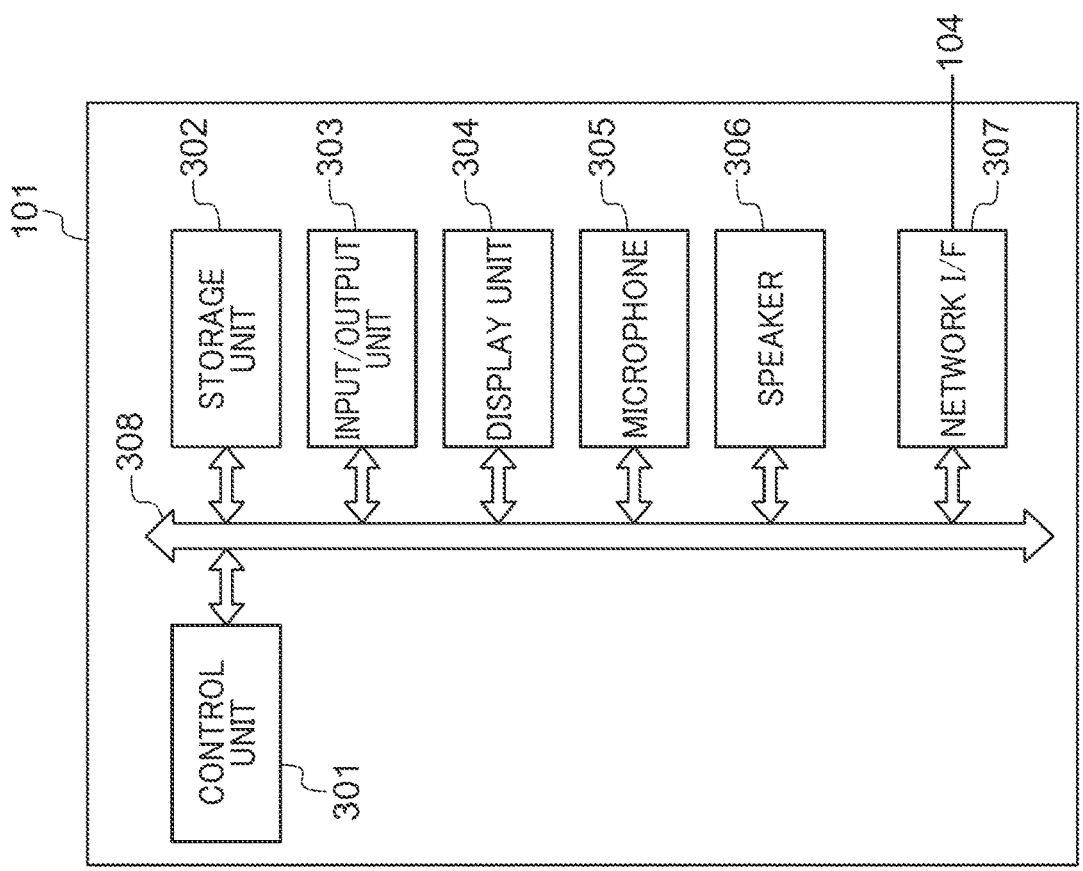

FIG. 3B is a block diagram that schematically shows a configuration of the mobile terminal 102 shown in FIG. 1. As shown in FIG. 3B, the mobile terminal 102 includes a control unit 311, a storage unit 312, an input/output unit 313, a display unit 314, a microphone 315, a speaker 316, and a network I/F 317. The control unit 311, the storage unit 312, the input/output unit 313, the display unit 314, the microphone 315, the speaker 316, and the network I/F 317 are connected to each other via a bus 318.

The control unit 311 comprehensively controls respective devices connected via the bus 318 by executing a control program stored in the storage unit 312. The control unit 311 includes one or a plurality of CPUs, or the like. The storage unit 312 is configured by an HDD, an SSD, a RAM, a ROM, etc., and is used as an internal storage of the mobile terminal 102. The storage unit 312 stores text data, audio data, image data, system software, etc.

The input/output unit 313 includes, for example, an LCD touch panel, etc., and transmits information, which indicates the content of the user's operation on the input/output unit 313, to the control unit 311. The method for detecting the operation of the touch panel may be a general detection method such as a resistive film method, an infrared method, an electromagnetic induction method, or a capacitance method. It should be noted that the input of various kinds of instructions by the user may be realized by using a hardware input device such as a switch or a keyboard.

The display unit 314 provides a user interface. The display unit 314 displays, for example, a chat screen to be described below or a login screen for logging in to the chat application. In the preferred embodiment of the present invention, when the user B enters (inputs) a user ID and a password on the login screen displayed on the display unit 314 of the mobile terminal 102, the mobile terminal 102 transmits the user ID and the password to the chat server 105. The chat server 105 performs user authentication based on the received user ID and the received password, and in the case that the user authentication is successful, transmits a notification, which indicates that the user authentication has been successful, to the mobile terminal 102. When the mobile terminal 102 receives the notification, which indicates that the user authentication has been successful, the mobile terminal 102 logs in to the chat application, and the chat screen to be described below is displayed on the display unit 314.

The microphone 315 is used to input audio. The speaker 316 is used to output audio. It should be noted that in the preferred embodiment of the present invention, although a configuration in which audio is outputted from the speaker 316 built into the mobile terminal 102 will be described, a configuration in which audio is outputted from an audio output device such as an earphone or a speaker connected to the mobile terminal 102 may also be used. The network I/F 317 is connected to the Internet 104 to perform network communication.

Next, message communication performed in the chat system in the preferred embodiment of the present invention will be described. First, a processing of sending a text message will be described.

FIG. 4 is a sequence diagram that shows a procedure of a text message communication processing performed in the chat system in the preferred embodiment of the present invention. It should be noted that in FIG. 4, a case will be described as an example in which a text message is transmitted (sent) from the mobile terminal 101 to the mobile terminal 102. In addition, in FIG. 4, it is assumed that the mobile terminal 101 on a sending side has already logged in to the chat application and a chat screen shown in FIG. 5A is displayed on the display unit 304. The chat screen shown in FIG. 5A is a chat screen corresponding to a chat room for performing message communication with the mobile terminal 102 of the user B, who is the conversation partner. The chat screen shown in FIG. 5A displays messages exchanged between the user A and the user B in chronological order (in timeline). It should be noted that in FIG. 5A, as an example, a configuration will be described in which an icon corresponding to the operator of the mobile terminal is displayed on the right side, but the icon may be displayed on the left side. On the chat screen shown in FIG. 5A, an already-read notification 502 is displayed near a message 501 sent by the user A. The already-read notification 502 is a notification indicating that the message 501 has been displayed on the mobile terminal 102 on a receiving side. Since the already-read notification 502 is displayed, the user A is able to know that the user B has already confirmed the message 501.

The text message communication processing shown in FIG. 4 is executed when the user A performs a text message input operation with respect to the mobile terminal 101. The text message input operation is, for example, an operation of inputting (entering) a message into a message input field 503 on the chat screen shown in FIG. 5A.

As shown in FIG. 4, first, the mobile terminal 101 transmits text data corresponding to the inputted text message to the chat server 105 in accordance with a transmission instruction received from the user A (S (step) 401). In addition, a text message 504 shown in FIG. 5B inputted by the user A is displayed on the chat screen displayed on the display unit 304 of the mobile terminal 101. It should be noted that at this time point, since the text message 504 is not displayed on the mobile terminal 102 of the user B who is the conversation partner, no already-read notification is displayed near the text message 504.

The chat server 105 performs a message management processing shown in FIG. 6, which will be described below (S402). In the message management processing, the data received from the mobile terminal 101 is stored in the storage unit 203, and this data is transmitted to the mobile terminal 102. It should be noted that details of the message management processing will be described below.

Next, the mobile terminal 102 performs a message reception processing shown in FIG. 7A, which will be described below (S403), and receives the text data from the chat server 105. It should be noted that details of the message reception processing will be described below. Next, the mobile terminal 102 performs a message display processing shown in FIG. 7B, which will be described below (S404). In the message display processing, the chat screen including the text message corresponding to the received text data is displayed on the display unit 314, and already-read information indicating the displayed text message is transmitted to the chat server 105. It should be noted that details of the message display processing will be described below.

The chat server 105 transmits the already-read information received from the mobile terminal 102 to the mobile terminal 101 (S405). Next, the mobile terminal 101 performs an already-read notification processing shown in FIG. 8, which will be described below (S406), and causes to display the already-read notification near the text message 504 on the chat screen displayed on the display unit 304 based on the received already-read information. It should be noted that details of the already-read notification processing will be described below. In this way, in the chat system in the preferred embodiment of the present invention, text message communication is performed between the mobile terminal 101 and the mobile terminal 102.

Figure 6:
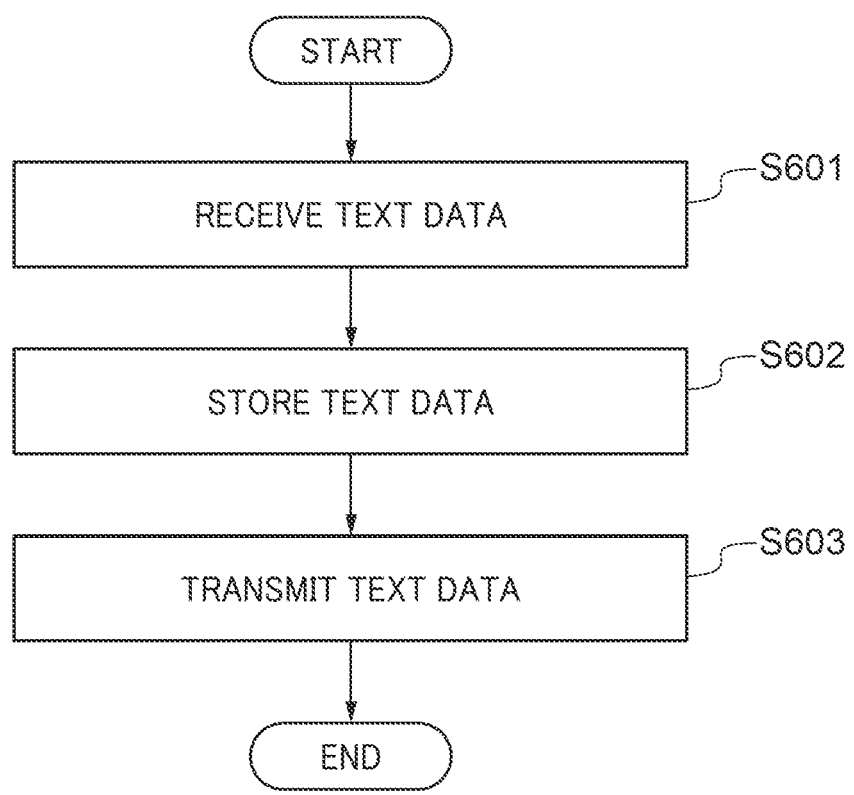
FIG. 6 is a flowchart that shows a procedure of a message management processing performed in S402 of FIG. 4.

FIG. 6 is a flowchart that shows a procedure of the message management processing performed in S402 of FIG. 4. The message management processing shown in FIG. 6 is realized by the control unit 201 of the chat server 105 executing a program stored in the storage unit 203. It should be noted that the chat server 105 manages a plurality of chat rooms, and the plurality of chat rooms include the chat room in which the user A and the user B exchange messages (the user A performs the message communication with the user B).

As shown in FIG. 6, the control unit 201 receives the data of the message, specifically the text data, from the mobile terminal 101 (S601). The text data includes a chat room ID for identifying the chat room, in which the user A carrying the mobile terminal 101 performs the message communication with the user B. Next, the control unit 201 stores the data of the message that has been received, specifically the text data, in the storage unit 203 (S602). Next, the control unit 201 transmits the received text data to the mobile terminal 102, which is the terminal of the user B registered in the chat room indicated by the chat room ID included in the received text data (S603). After that, the message management processing shown in FIG. 6 ends.

Figure 7B:
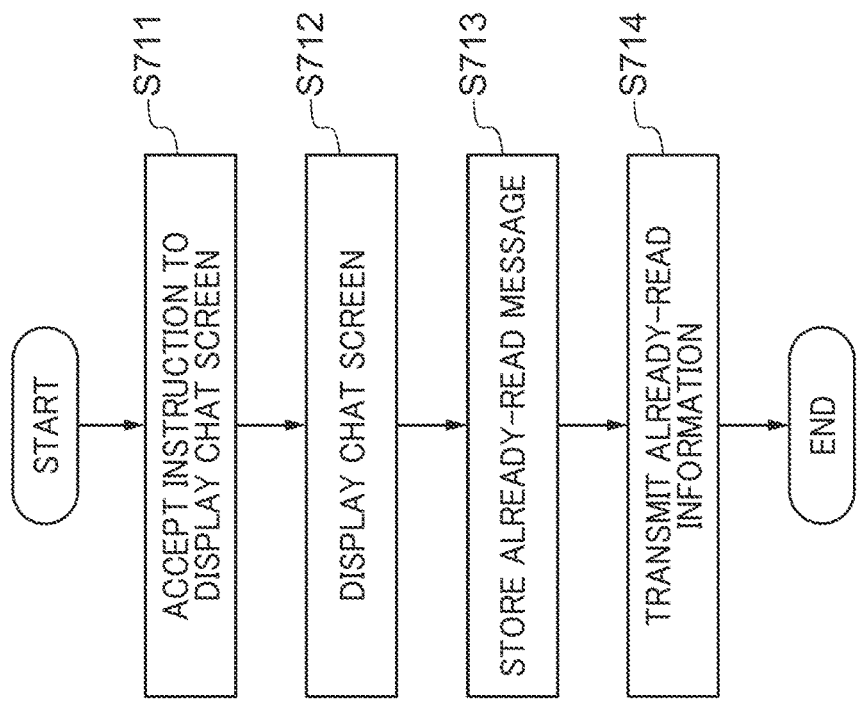
FIG. 7B is a flowchart that shows a procedure of a message display processing performed in S404 of FIG. 4.
Figure 7A:
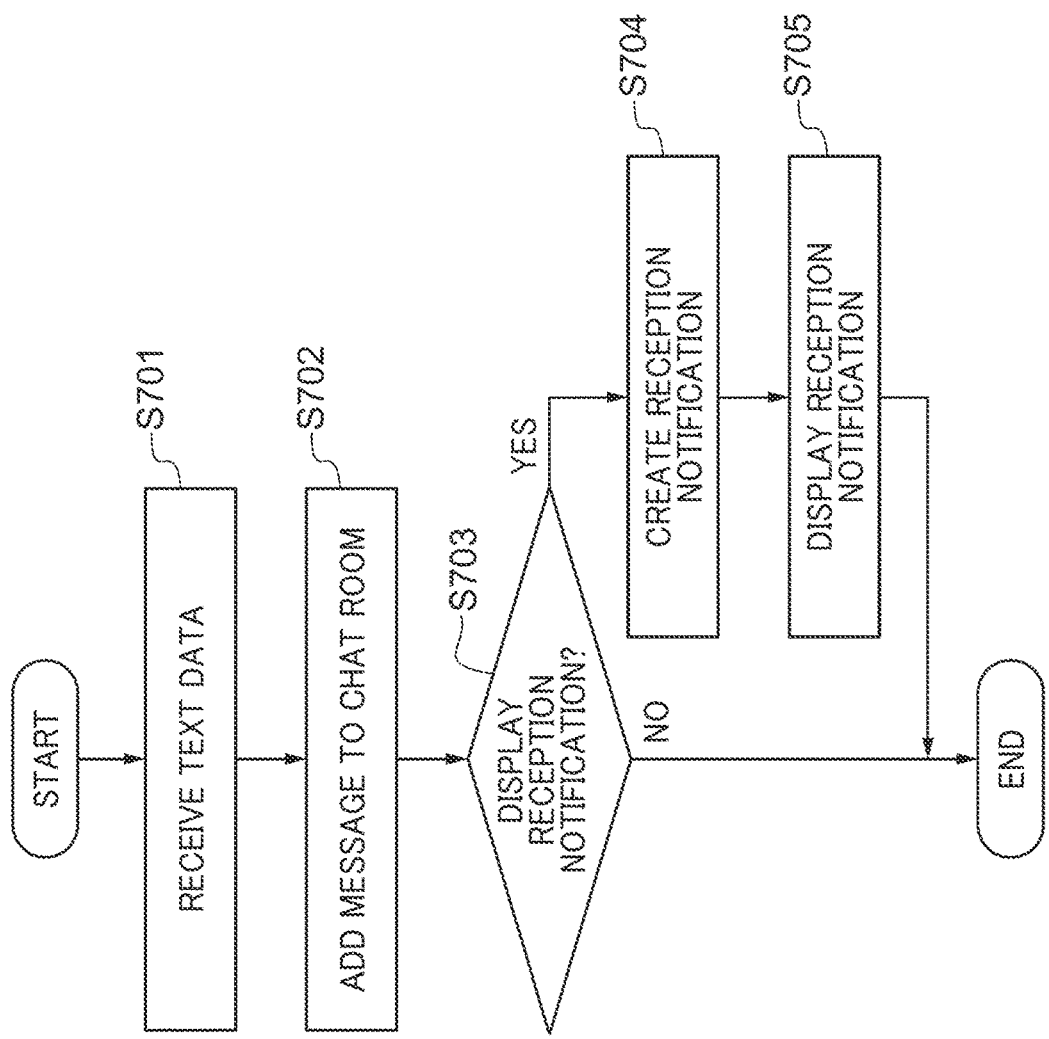
FIG. 7A is a flowchart that shows a procedure of a message reception processing performed in S403 of FIG. 4.

FIG. 7A is a flowchart that shows a procedure of the message reception processing performed in S403 of FIG. 4. The message reception processing shown in FIG. 7A is realized by the control unit 311 of the mobile terminal 102 executing a program stored in the storage unit 312. The message reception processing shown in FIG. 7A is executed when the text data is transmitted from the chat server 105 in the message management processing described above.

As shown in FIG. 7A, the control unit 311 receives the text data from the chat server 105 (S701). Next, the control unit 311 adds the message corresponding to the received text data to the chat room indicated by the chat room ID included in the received text data (S702). Next, the control unit 311 determines whether or not to display a reception notification, which indicates that the message has been received, on the display unit 314 (S703). The determination in S703 is made based on notification presence/absence information. The notification presence/absence information is set in advance by the user and is stored in the storage unit 312. For example, in the case that the notification presence/absence information stored in the storage unit 312 indicates "no notification", the control unit 311 determines not to display the reception notification on the display unit 314. In this case, the message reception processing shown in FIG. 7A ends. On the other hand, in the case that the notification presence/absence information stored in the storage unit 312 indicates "notification present", the control unit 311 determines to display the reception notification on the display unit 314. In this case, the message reception processing shown in FIG. 7A proceeds to S704.

In S704, the control unit 311 creates a reception notification. Next, the control unit 311 causes the display unit 314 to display the created reception notification on (S705). It should be noted that, depending on the settings, a notification sound indicating that the message has been received may be outputted from the speaker 316 to notify the user. After that, the message reception processing shown in FIG. 7A ends.

FIG. 7B is a flowchart that shows a procedure of the message display processing performed in S404 of FIG. 4. The message display processing shown in FIG. 7B is realized by the control unit 311 of the mobile terminal 102 executing a program stored in the storage unit 312.

As shown in FIG. 7B, the control unit 311 accepts an instruction from the user B to display the chat screen corresponding to the chat room for performing the message communication with the user A (S711). Next, the control unit 311 causes the display unit 314 to display the chat screen according to this display instruction (S712). For example, the text message corresponding to the text data received by the message reception processing shown in FIG. 7A is displayed on this chat screen. Next, the control unit 311 stores the latest message among the messages displayed for the first time on this chat screen, that is, the latest message among the messages that have not been confirmed so far, as an already-read message (S713). Next, the control unit 311 transmits information indicating the stored already-read message to the chat server 105 as the already-read information (S714). The information indicating the stored already-read message is, for example, an identification number for identifying the stored already-read message or a number indicating the display order of the stored already-read message on the chat screen. The already-read information includes the chat room ID indicating the chat room corresponding to the chat screen. After that, the message display processing shown in FIG. 7B ends.

Figure 8:
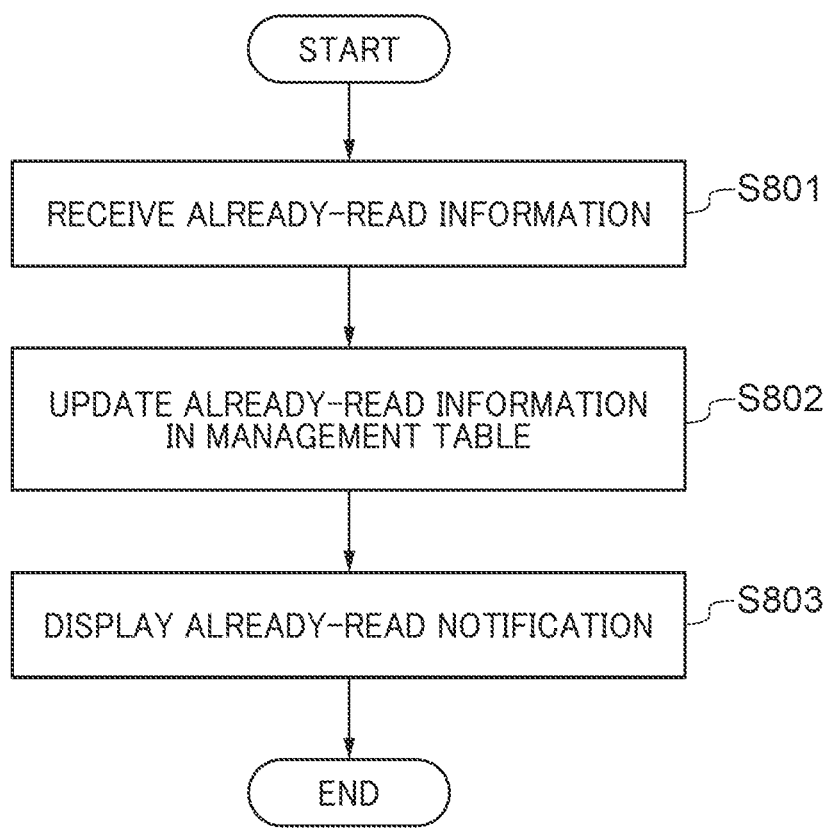
FIG. 8 is a flowchart that shows a procedure of an already-read notification processing performed in S406 of FIG. 4.

FIG. 8 is a flowchart that shows a procedure of the already-read notification processing performed in S406 of FIG. 4. The already-read notification processing shown in FIG. 8 is realized by the control unit 301 of the mobile terminal 101 executing a program stored in the storage unit 302. The already-read notification processing shown in FIG. 8 is executed when the mobile terminal 101 has logged in to the chat application. For example, in the case that the mobile terminal 101 continues to log in to the chat application even after transmitting the text data of the text message 504, the already-read notification processing shown in FIG. 8 is executed immediately when the already-read information is transmitted from the chat server 105. In addition, in the case that the mobile terminal 101 logs out of the chat application after transmitting the text data of the text message 504, the already-read notification processing shown in FIG. 8 is executed when the mobile terminal 101 logs in to the chat application again.

Figure 9:
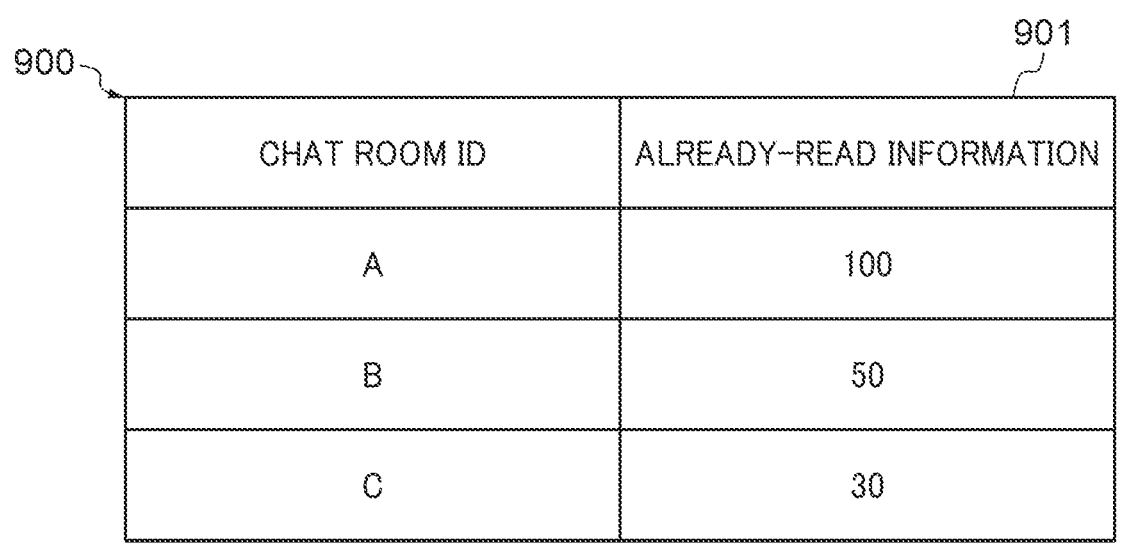

As shown in FIG. 8, the control unit 301 receives the already-read information from the chat server 105 (S801). Next, the control unit 301 updates the already-read information in a management table 900 shown in FIG. 9 stored in the storage unit 302 (S802). Specifically, the control unit 301 updates information corresponding to the chat room ID included in the already-read information received in S801 to the already-read information received in S801 in a column of already-read information 901 of the management table 900. Next, the control unit 301 causes to display the already-read notification on the chat screen based on the management table 900 (S803). For example, based on the management table 900, the already-read notification is displayed near the text message 504 on the chat screen displayed on the display unit 304. After that, the already-read notification processing shown in FIG. 8 ends.

In this way, in the case that the message sent is a text message, by causing the mobile terminal 102 of the user B who is the conversation partner to display the message sent (the text message), the user B is able to know the content of the message sent (the text message). However, in the case that the message sent is a playback-type message such as a voice messages or a moving image message (a video message), if the message sent (the playback-type message) is not played back, the user B is not able to know the content of the message sent (the playback-type message). For this reason, with the configuration that causes to display the already-read notification on the mobile terminal 101 when a playback button for the playback-type message is displayed on the mobile terminal 102, the user A is not able to know from the already-read notification whether or not the content of the sent playback-type message has been conveyed to the user B.

In order to deal with this issue, in the preferred embodiment of the present invention, based on the fact that the mobile terminal 102 of the user B has played back the playback-type message based on the data received from the mobile terminal 101 of the user A, already-played-back information, which will be described below, is transmitted to the mobile terminal 101. The mobile terminal 101 causes to display an already-played-back notification, which will be described below, based on the received already-played-back information, which will be described below.

Figure 10:
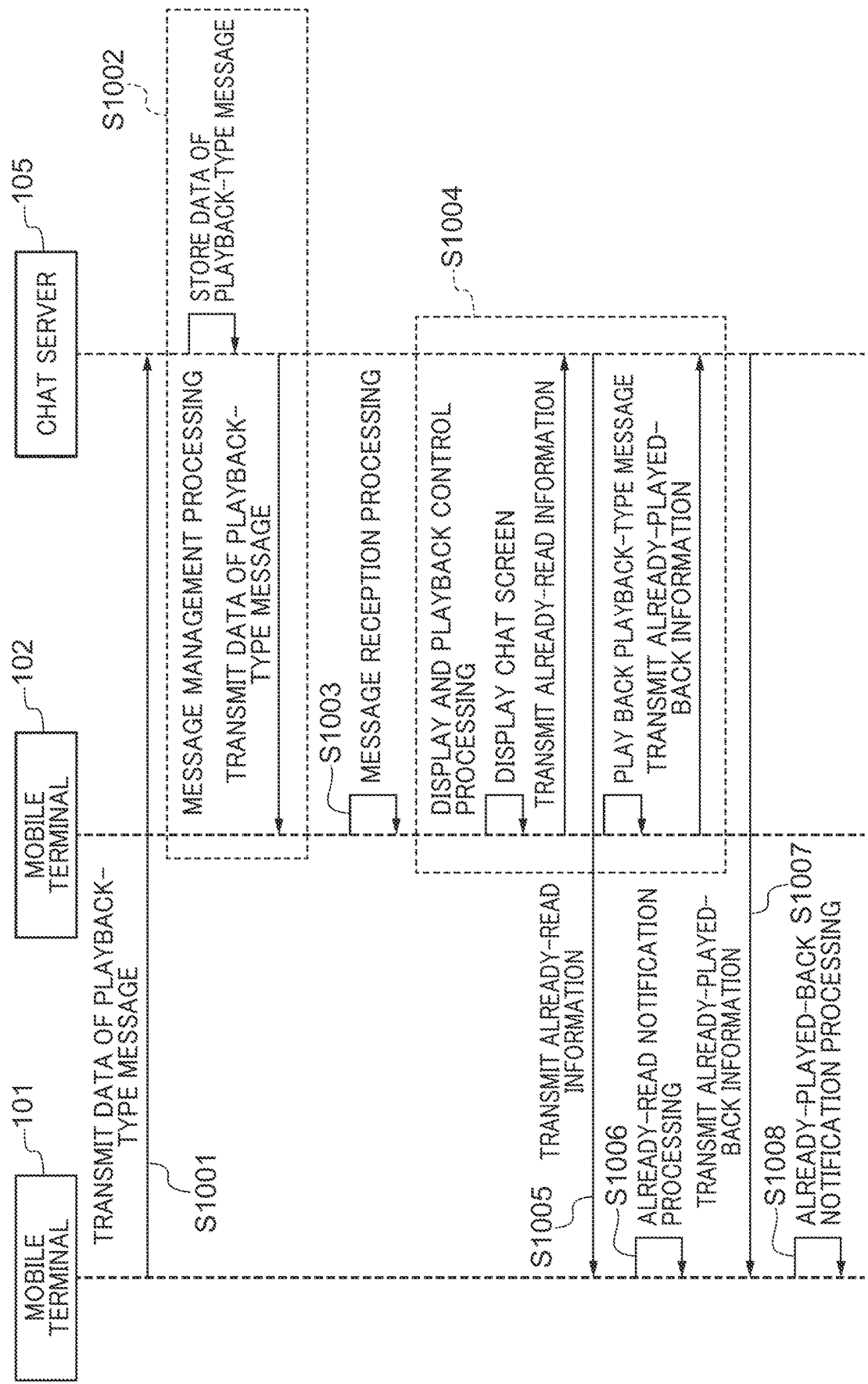
FIG. 10 is a sequence diagram that shows a procedure of a playback-type message communication processing performed in the chat system in the preferred embodiment of the present invention.

FIG. 10 is a sequence diagram that shows a procedure of a playback-type message communication processing performed in the chat system in the preferred embodiment of the present invention. It should be noted that in FIG. 10, a case will be described as an example in which data of a playback-type message is transmitted (sent) from the mobile terminal 101 to the mobile terminal 102. In addition, in FIG. 10, it is assumed that the mobile terminal 101 on the sending side has already logged in to the chat application and the chat screen shown in FIG. 5A is displayed on the display unit 304.

The playback-type message communication processing shown in FIG. 10 is executed when the user A performs a playback-type message input operation with respect to the mobile terminal 101. The playback-type message input operation is, for example, an operation of inputting a voice message by pressing a voice input button 1101 shown in FIG. 11A that is displayed by pressing an operation button (not shown). When the voice input button 1101 is pressed, the chat application of the mobile terminal 101 starts recording of the voice message uttered by the user A into the microphone 305. When the user A presses the voice input button 1101 again, the chat application of the mobile terminal 101 finishes the recording of the voice message and stores audio data for playing back the recorded voice message in the storage unit 302.

As shown in FIG. 10, first, the mobile terminal 101 transmits data of the playback-type message inputted to the chat server 105 in accordance with a transmission instruction received from the user A (S1001). It should be noted that the data of the playback-type message is data for playing back the playback-type message, such as audio data or moving image data.

Figure 11B:
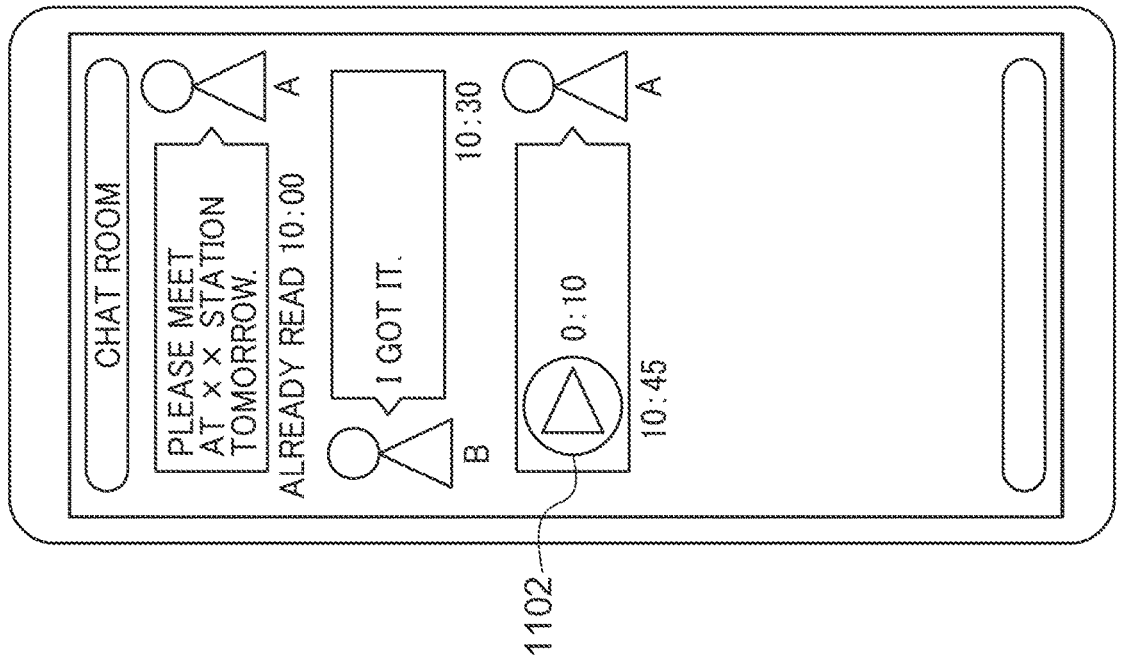
FIGS. 11A and 11B are diagrams that show an example of the chat screen displayed on the display unit of the mobile terminal on the sending side.
Figure 11A:
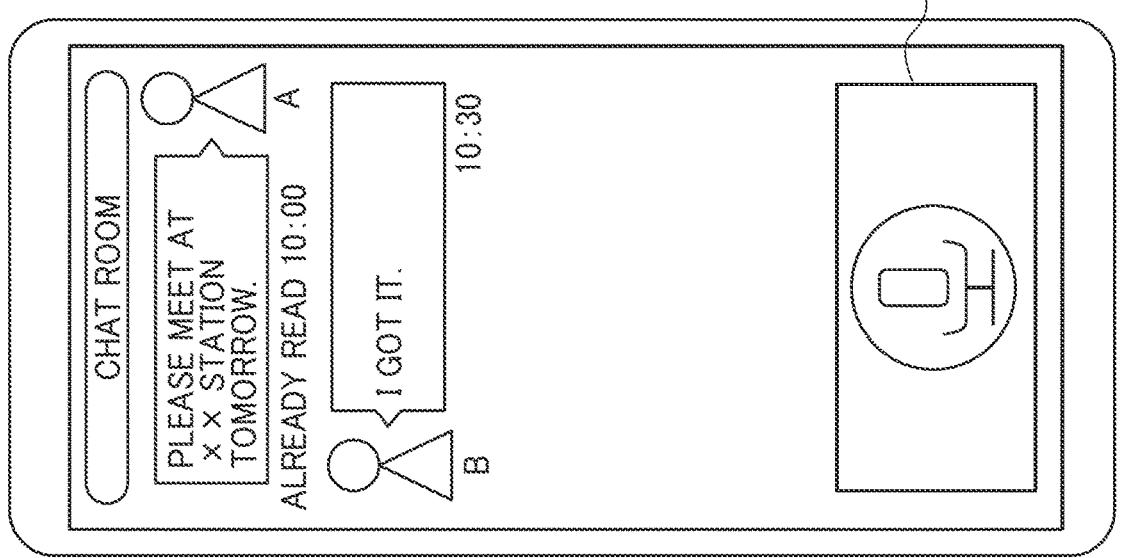

In addition, the mobile terminal 101 causes to display a playback button 1102 shown in FIG. 11B, which is an object for issuing an instruction to play back the above-mentioned playback-type message, on the chat screen displayed on the display unit 304. When the user A presses the playback button 1102, the above-mentioned playback-type message is outputted from the speaker 306 or the display unit 304 of the mobile terminal 101. It should be noted that at this time point, since a playback button for the above-mentioned playback-type message is not displayed on the mobile terminal 102 of the user B who is the conversation partner, no already-read notification is displayed near the playback button 1102.

The chat server 105 performs the message management processing shown in FIG. 6, which has been described above (S1002). In S1002, the data of the playback-type message received from the mobile terminal 101 is stored in the storage unit 203, and this data is transmitted to the mobile terminal 102.

Next, the mobile terminal 102 performs the message reception processing shown in FIG. 7A, which has been described above (S1003), and receives the data of the playback-type message from the chat server 105.

Next, the mobile terminal 102 performs a display and playback control processing shown in FIG. 12, which will be described below, based on the data of the playback-type message received from the chat server 105 (S1004). In the display and playback control processing, the chat screen, which includes the playback button to play back the playback-type message corresponding to the received data, is displayed on the display unit 314, and already-read information indicating the playback-type message in which the playback button has been displayed is transmitted to the chat server 105.

The chat server 105 transmits the already-read information received from the mobile terminal 102 to the mobile terminal 101 (S1005). The mobile terminal 101 performs the already-read notification processing shown in FIG. 8, which has been described above, based on the already-read information received from the chat server 105 (S1006). As a result, on the chat screen displayed on the display unit 304 of the mobile terminal 101, the already-read notification is displayed near the playback button 1102.

In addition, in the display and playback control processing, when the user B presses the above-mentioned playback button after the already-read information is transmitted to the chat server 105, the playback-type message corresponding to the data received from the chat server 105 is played back. Furthermore, already-played-back information indicating that this playback-type message has been played back is transmitted to the chat server 105. The chat server 105 transmits the already-played-back information received from the mobile terminal 102 to the mobile terminal 101 (S1007). The mobile terminal 101 performs an already-played-back notification processing shown in FIG. 13, which will be described below, based on the already-played-back information received from the chat server 105 (S1008). As a result, on the chat screen displayed on the display unit 304 of the mobile terminal 101, as shown in FIG. 14B, which will be described below, an already-played-back notification 1403 is displayed near a playback button 1402.

Figure 12:
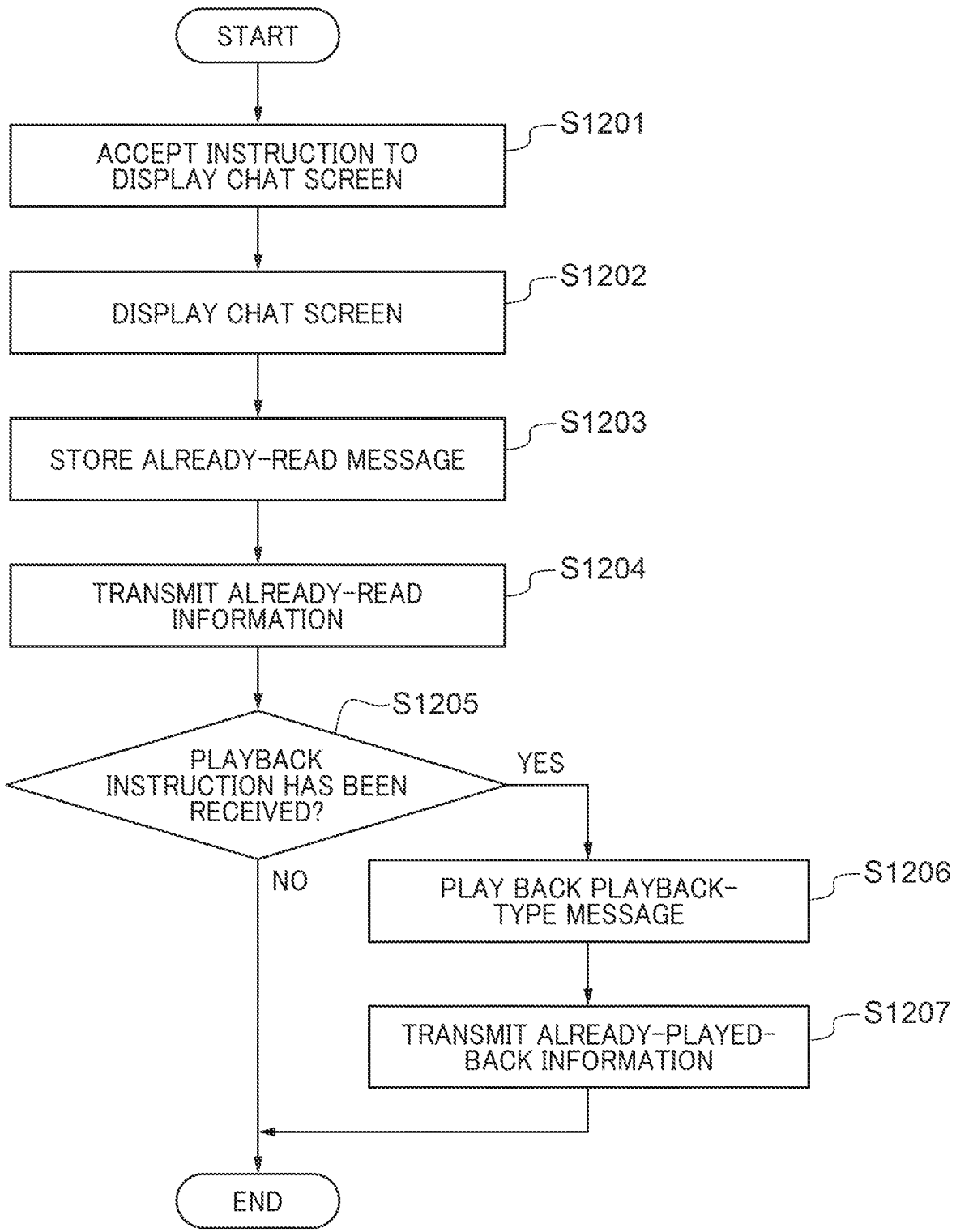
FIG. 12 is a flowchart that shows a procedure of a display and playback control processing performed in S1004 of FIG. 10.

FIG. 12 is a flowchart that shows a procedure of the display and playback control processing performed in S1004 of FIG. 10. The display and playback control processing shown in FIG. 12 is realized by the control unit 311 of the mobile terminal 102 executing a program stored in the storage unit 312. It should be noted that the display and playback control processing shown in FIG. 12 is a processing similar to the message display processing shown in FIG. 7B described above, and in particular, the contents that are different from the message display processing shown in FIG. 7B described above will be described below.

As shown in FIG. 12, first, the control unit 311 performs S1201 to S1204, which are the same processes as S711 to S714 described above, and transmits already-read information to the chat server 105. This already-read information is transmitted from the chat server 105 to the mobile terminal 101. The mobile terminal 101 performs the already-read notification processing described above to cause to on the chat screen displayed on the display unit 304, display an already-read notification near the playback button 1102 shown in FIG. 11B corresponding to the sent playback-type message. The user A, who operates the mobile terminal 101, is able to know from this already-read notification that the playback button corresponding to the sent playback-type message has been displayed on the display unit 314 of the mobile terminal 102 of the user B.

Next, the control unit 311 determines whether or not an instruction to play back the playback-type message has been received from the user B (S1205). In the preferred embodiment of the present invention, the user B is able to issue the instruction to play back the playback-type message by pressing the playback button on the chat screen displayed on the display unit 314. In the case of being determined in S1205 that the instruction to play back the playback-type message has not been received from the user B, the display and playback control processing ends. On the other hand, in the case of being determined in S1205 that the instruction to play back the playback-type message has been received from the user B, the display and playback control processing proceeds to S1206.

In S1206, the control unit 311 plays back the playback-type message corresponding to the pressed playback button. For example, in the case that the playback-type message corresponding to the pressed playback button is a voice message, the control unit 311 causes the speaker 316 to output the voice message corresponding to the pressed playback button. In addition, in the case that the playback-type message corresponding to the pressed playback button is a moving image message, the control unit 311 causes the speaker 316 to output the audio of the moving image message corresponding to the pressed playback button, and causes the display unit 314 to display the video of the moving image message corresponding to the pressed playback button. Next, the control unit 311 transmits already-played-back information indicating the playback-type message played back in S1206 to the chat server 105 (S1207). The already-played-back information is, for example, an identification number for identifying the playback-type message played back in S1206 or a number indicating the display order of the playback-type message played back in S1206 on the chat screen. In addition, the already-played-back information includes the chat room ID indicating the chat room corresponding to the chat screen displayed on the display unit 314. After that, the display and playback control processing ends.

Figure 13:
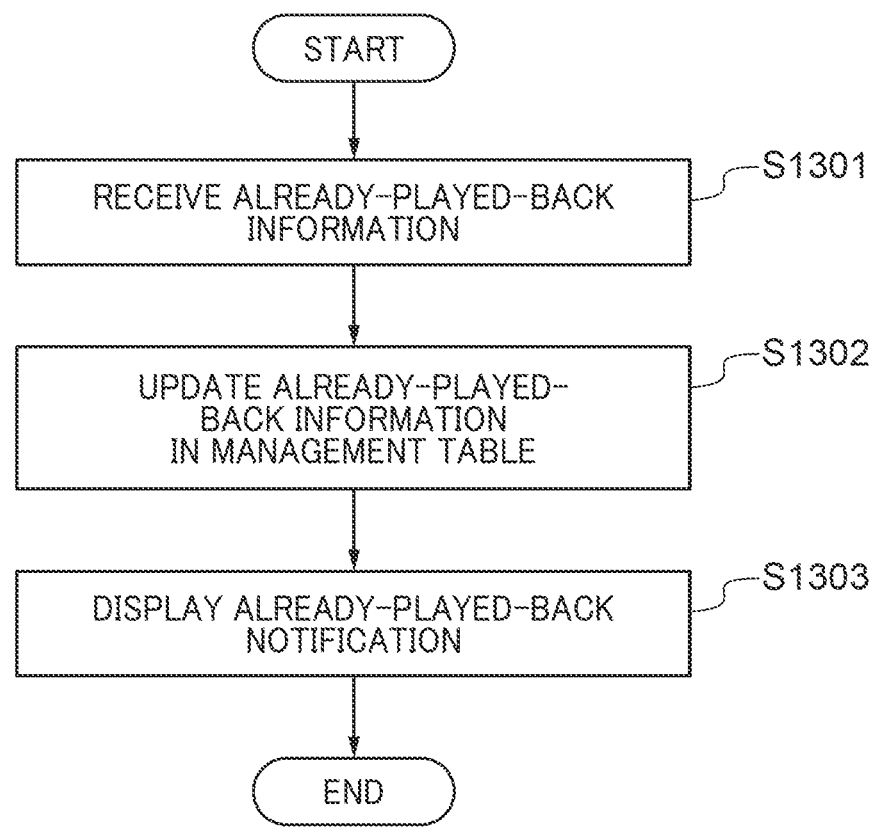
FIG. 13 is a flowchart that shows a procedure of an already-played-back notification processing performed in S1008 of FIG. 10.

FIG. 13 is a flowchart that shows a procedure of the already-played-back notification processing performed in S1008 of FIG. 10. The already-played-back notification processing shown in FIG. 13 is realized by the control unit 301 of the mobile terminal 101 executing a program stored in the storage unit 302. The already-played-back notification processing shown in FIG. 13 is executed when the mobile terminal 101 has logged in to the chat application. For example, in the case that the mobile terminal 101 continues to log in to the chat application even after transmitting the data of the playback-type message, the already-played-back notification processing shown in FIG. 13 is executed immediately when the already-played-back information is transmitted from the chat server 105. In addition, in the case that the mobile terminal 101 logs out of the chat application after transmitting the data of the playback-type message, the already-played-back notification processing shown in FIG. 13 is executed when the mobile terminal 101 logs in to the chat application again.

Figure 14A:
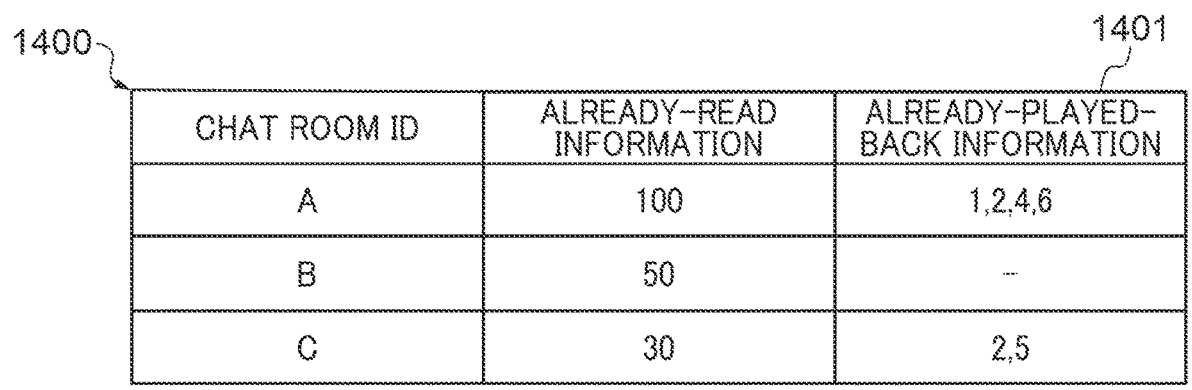
FIG. 14A is a diagram that shows an example of a management table updated in S1302 of FIG. 13.
Figure 14B:
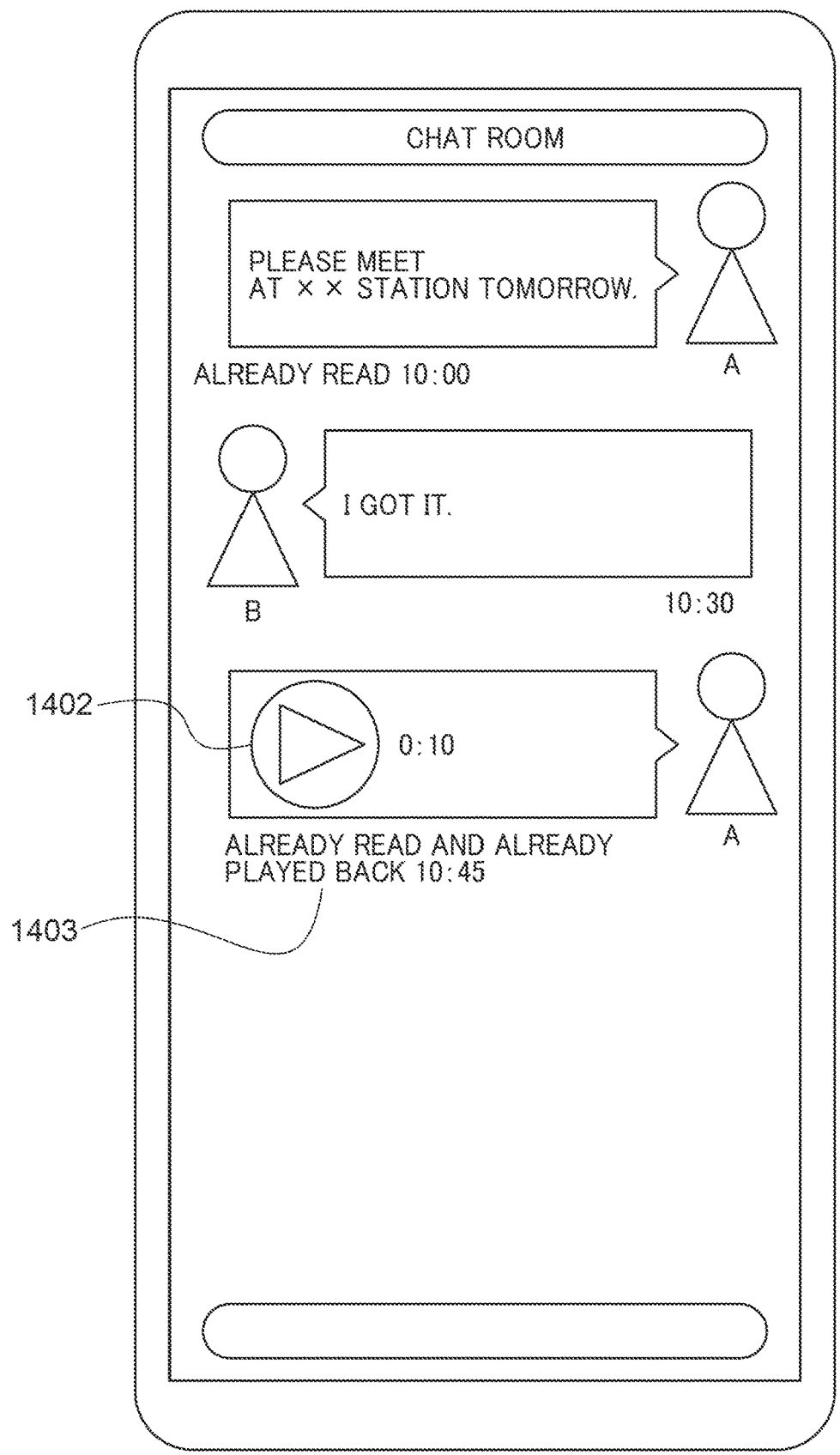
FIG. 14B is a diagram that shows an example of the chat screen displayed on the display unit of the mobile terminal on the sending side.

As shown in FIG. 13, the control unit 301 receives the already-played-back information from the chat server 105 (S1301). Next, the control unit 301 updates already-played-back information in a management table 1400 shown in FIG. 14A stored in the storage unit 302 (S1302). In addition to the already-read information, in the management table 1400, already-played-back information 1401, which is information indicating which playback-type message has been played back by the recipient in each chat room, is managed. In S1302, the control unit 301 adds information corresponding to the chat room ID included in the already-played-back information received in S1301 to the already-played-back information received in S1301 in a column of the already-played-back information 1401 of the management table 1400.

Next, the control unit 301 causes to display the already-played-back notification based on the updated management table 1400 (S1303). For example, as shown in FIG. 14B, the control unit 301 causes to display the already-played-back notification 1403 near the playback button 1402 corresponding to the playback-type message transmitted in S1001. It should be noted that in the preferred embodiment of the present invention, although the configuration has been described in which a character string of "already played back" is displayed as the already-played-back notification 1403, the already-played-back notification 1403 is not limited to a character string. For example, the already-played-back notification 1403 may be a predetermined icon indicating that the playback-type message has been already played back. Alternatively, a configuration that changes the color of the playback button 1402 or the like to notify that the playback-type message has been already played back may be adopted. After that, the already-played-back notification processing ends.

According to the preferred embodiment of the present invention described above, based on the fact that the playback-type message has been played back based on the data transmitted from the mobile terminal 101 of the user A, the mobile terminal 102 of the user B, who is the conversation partner, transmits the already-played-back information to the mobile terminal 101. Based on the received already-played-back information, the mobile terminal 101 causes to display the already-played-back notification 1403 near the playback button 1402 for the playback-type message corresponding to the transmitted data. As a result, the user A is able to know whether or not the content of the sent playback-type message has been conveyed to the user B.

In addition, in the preferred embodiment of the present invention described above, the already-played-back notification 1403 is a notification different from the already-read notification indicating that the playback button 1402 has been displayed on the mobile terminal 102 of the user B. As a result, in addition to the fact that the playback button 1402 has been displayed on the mobile terminal 102 of the user B, the user A is also able to know the playback status of the playback-type message corresponding to the transmitted data.

Although the present invention has been described above by using the preferred embodiment described above, the present invention is not limited to the preferred embodiment described above. For example, the already-played-back notification may also be displayed on the terminal that has played back the message.

Figure 15:
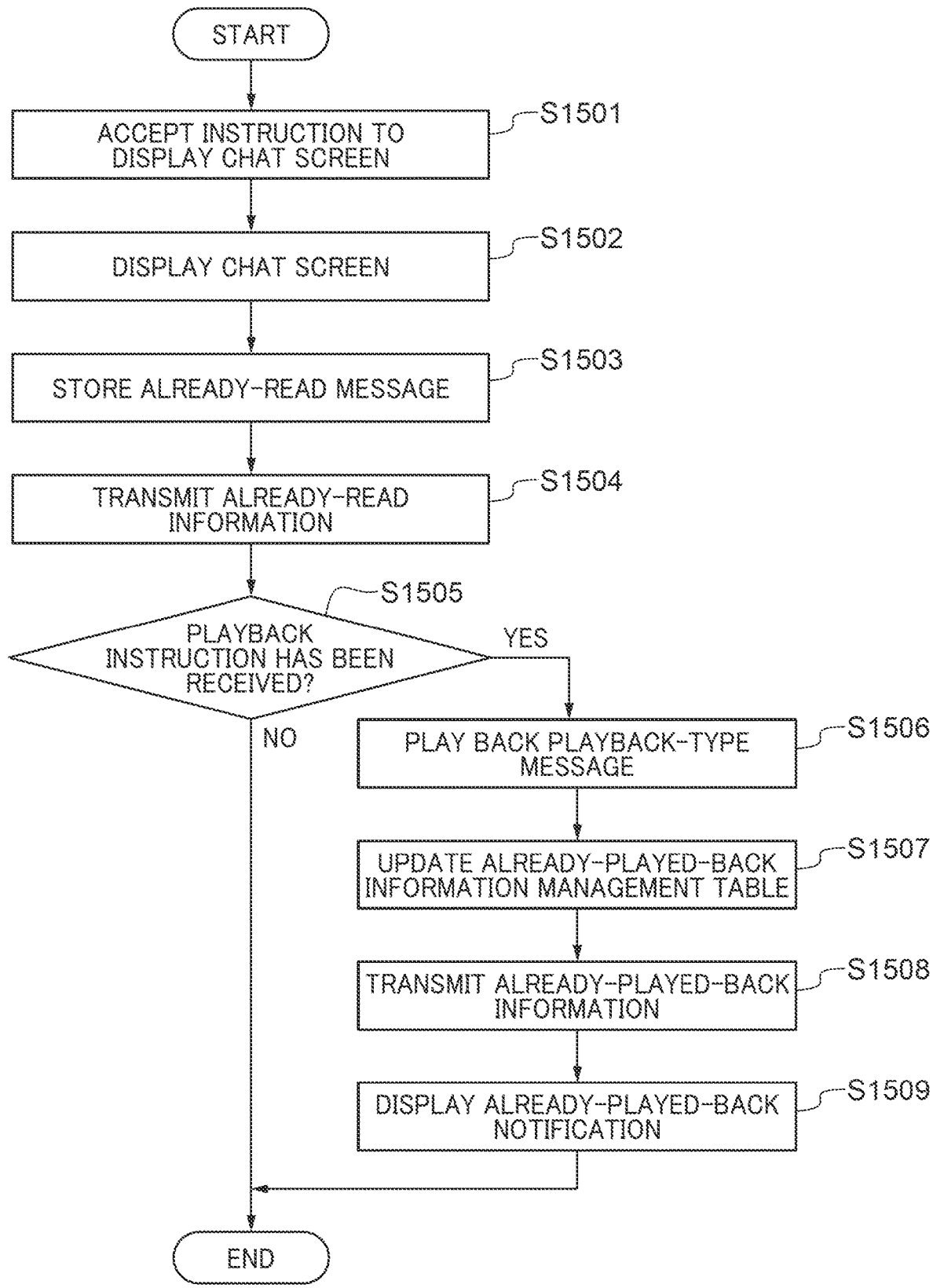
FIG. 15 is a flowchart that shows another procedure of the display and playback control processing performed in S1004 of FIG. 10.

FIG. 15 is a flowchart that shows another procedure of the display and playback control processing performed in S1004 of FIG. 10. It should be noted that the display and playback control processing shown in FIG. 15 is a processing similar to the display and playback control processing shown in FIG. 12 described above, and in particular, the contents that are different from the display and playback control processing shown in FIG. 12 described above will be described below. Similar to the display and playback control processing shown in FIG. 12, the display and playback control processing shown in FIG. 15 is also realized by the control unit 311 of the mobile terminal 102 executing a program stored in the storage unit 312.

As shown in FIG. 15, the control unit 311 performs S1501 to S1505, which are the same processes as S1201 to S1205 described above. In the case of being determined in S1505 that the instruction to play back the playback-type message has not been received from the user B, the display and playback control processing shown in FIG. 15 ends. On the other hand, in the case of being determined in S1505 that the instruction to play back the playback-type message has been received from the user B, the display and playback control processing shown in FIG. 15 proceeds to S1506, which is the same process as S1206, and then proceeds to S1507.

In S1507, the control unit 311 updates an already-played-back information management table stored in the storage unit 312. The already-played-back information management table is for managing the playback status of the playback-type message on the chat screen displayed on the display unit 314. The control unit 311 adds information indicating the playback-type message played back in S1507 to the already-played-back information management table. Next, the control unit 311 transmits the already-played-back information indicating the playback-type message played back in S1507 to the chat server 105 (S1508). This already-played-back information also includes the chat room ID indicating the chat room corresponding to the chat screen displayed on the display unit 314.

Figure 16:
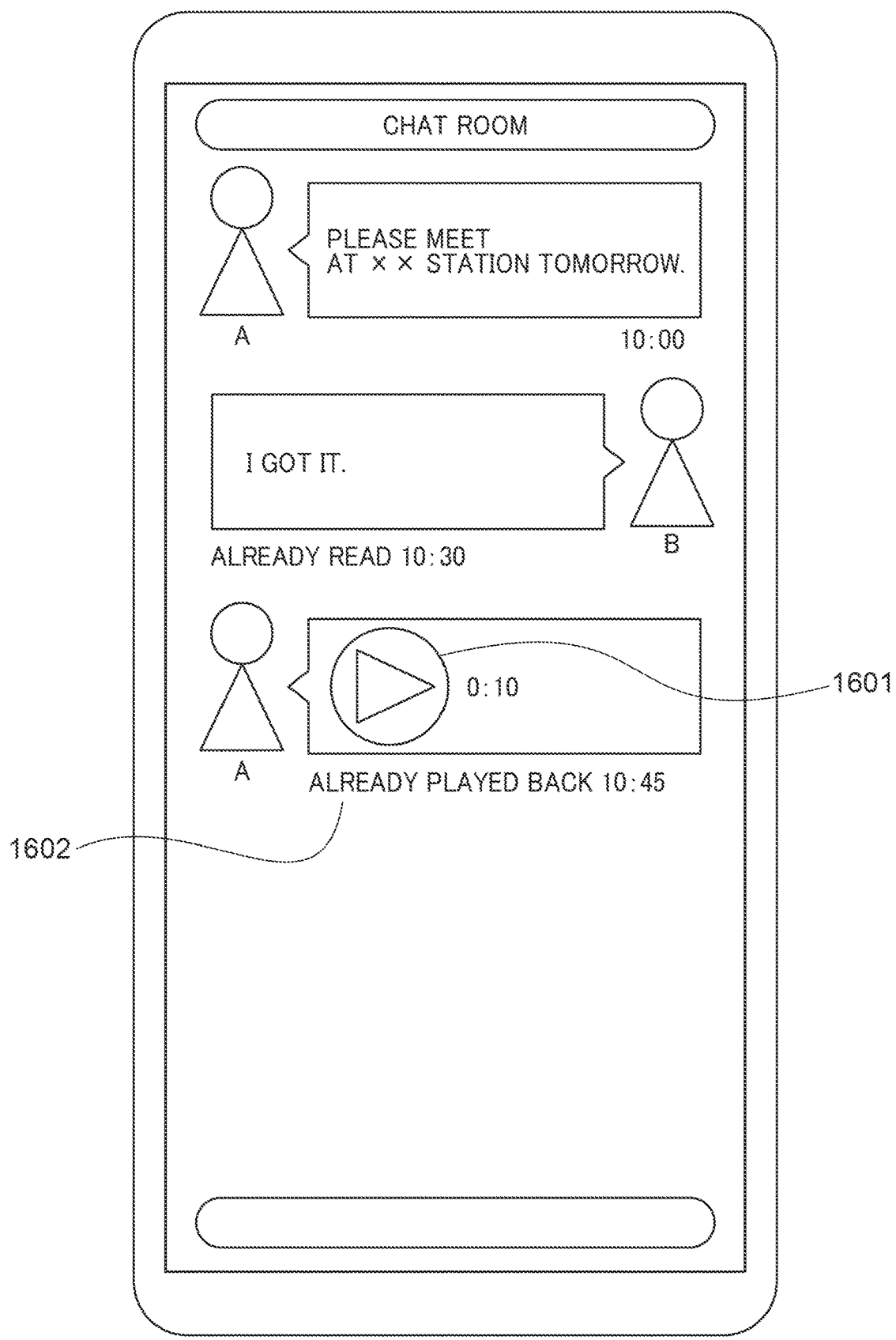
FIG. 16 is a diagram that shows an example of a chat screen displayed on a display unit of a mobile terminal on a receiving side.

Next, as shown in FIG. 16, the control unit 311 causes to display an already-played-back notification 1602 near a playback button 1601 of the playback-type message played back in S1507 (S1509). After that, the display and playback control processing shown in FIG. 15 ends.

In the preferred embodiment described above, when the mobile terminal 102 on the receiving side has played back the playback-type message, the already-played-back notification 1602 is displayed on the chat screen displayed on the display unit 314 of the mobile terminal 102. As a result, the user B, who is the receiving side (the recipient) of the playback-type message, is able to easily know whether or not the playback-type message sent from the user A, who is the conversation partner, has been played back.

In addition, in the preferred embodiment of the present invention, the number of times the message has been played back (a playback count of the message) may be displayed on the mobile terminal 101 on the sending side.

Figure 17:
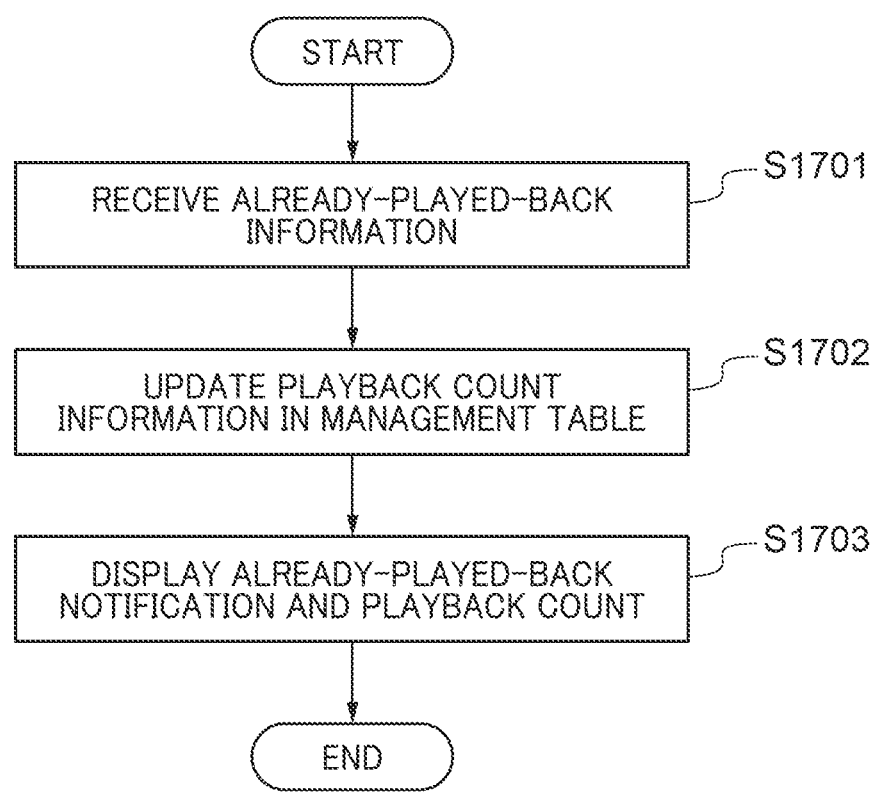
FIG. 17 is a flowchart that shows another procedure of the already-played-back notification processing performed in S1008 of FIG. 10.

FIG. 17 is a flowchart that shows another procedure of the already-played-back notification processing performed in S1008 of FIG. 10. It should be noted that the already-played-back notification processing shown in FIG. 17 is a processing similar to the already-played-back notification processing shown in FIG. 13 described above, and in particular, the contents that are different from the already-played-back notification processing shown in FIG. 13 described above will be described below. Similar to the already-played-back notification processing shown in FIG. 13 described above, the already-played-back notification processing shown in FIG. 17 is also realized by the control unit 301 of the mobile terminal 101 executing a program stored in the storage unit 302.

Figure 18A:
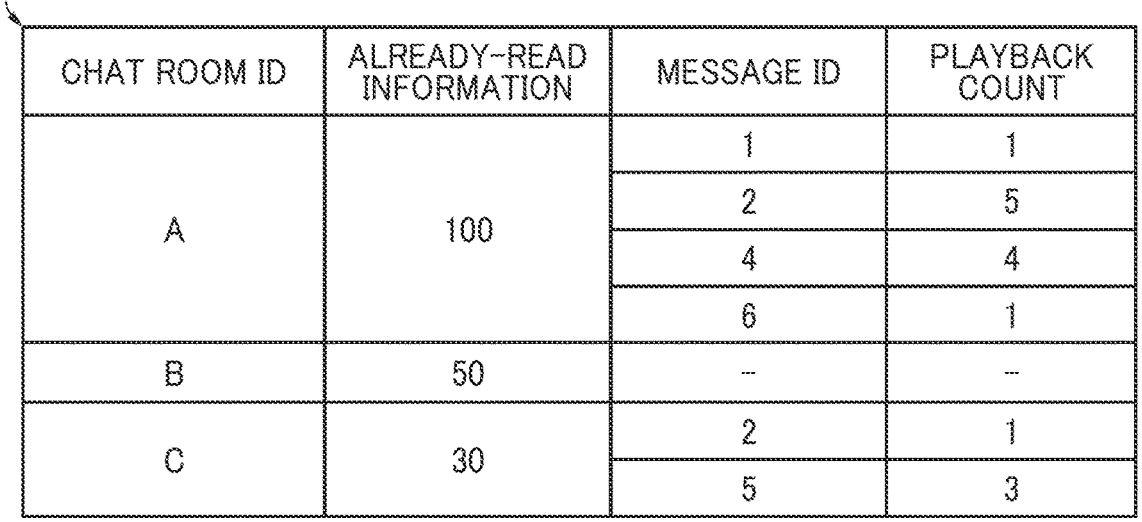
FIG. 18A is a diagram that shows an example of a management table updated in S1702 of FIG. 17.

As shown in FIG. 17, the control unit 301 performs S1701, which is the same process as S1301 described above. Next, the control unit 301 updates playback count information in a management table 1800 shown in FIG. 18A stored in the storage unit 302 based on the received already-played-back information (S1702). The management table 1800 is for managing which message has been played back and how many times by the recipient in each chat room. Specifically, in S1702, the control unit 301 increments the playback count of the playback message indicated by the already-played-back information in the management table 1800.

Figure 18B:
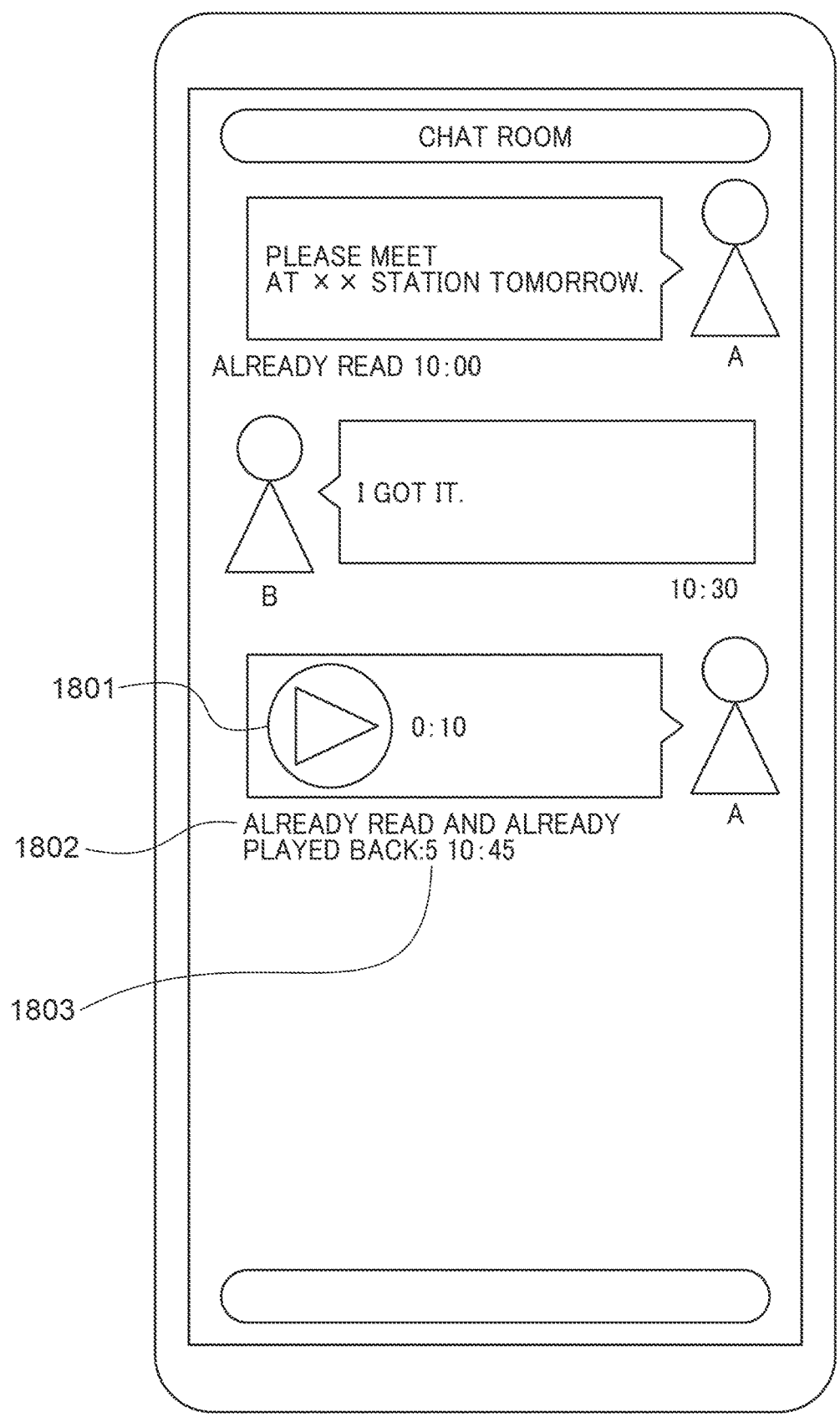
FIG. 18B is a diagram that shows an example of the chat screen displayed on the display unit of the mobile terminal on the sending side.

Next, the control unit 301 uses the updated management table 1800 to cause to display the already-played-back notification and the playback count on the chat screen displayed on the display unit 304 (S1703). For example, as shown in FIG. 18B, the control unit 301 causes to display a playback count 1803 along with an already-played-back notification 1802 near a playback button 1801 corresponding to the playback-type message transmitted to the mobile terminal 102. As a result, the user A is able to know the playback status of the sent message in more detail. After that, the already-played-back notification processing shown in FIG. 17 ends.

Furthermore, in the preferred embodiment of the present invention, similar to a text message, a configuration that causes to display an already-read notification to notify that a playback-type message has been played back may be adopted. In such a configuration, the chat system performs processing by using a procedure similar to the sequence shown in FIG. 4. Specifically, in S401, the mobile terminal 101 transmits data of a playback-type message to the chat server 105. In S402, the chat server 105 stores the data of the playback-type message received in the storage unit 203 and transmits the data of the playback-type message to the mobile terminal 102. In S403, the mobile terminal 102 performs the message reception processing described above based on the data of the playback-type message. After that, S404 to S406 are performed. It should be noted that the message display processing performed in S404 is different from the message display processing shown in FIG. 7B described above, and is performed in the following procedure.

Figure 19:
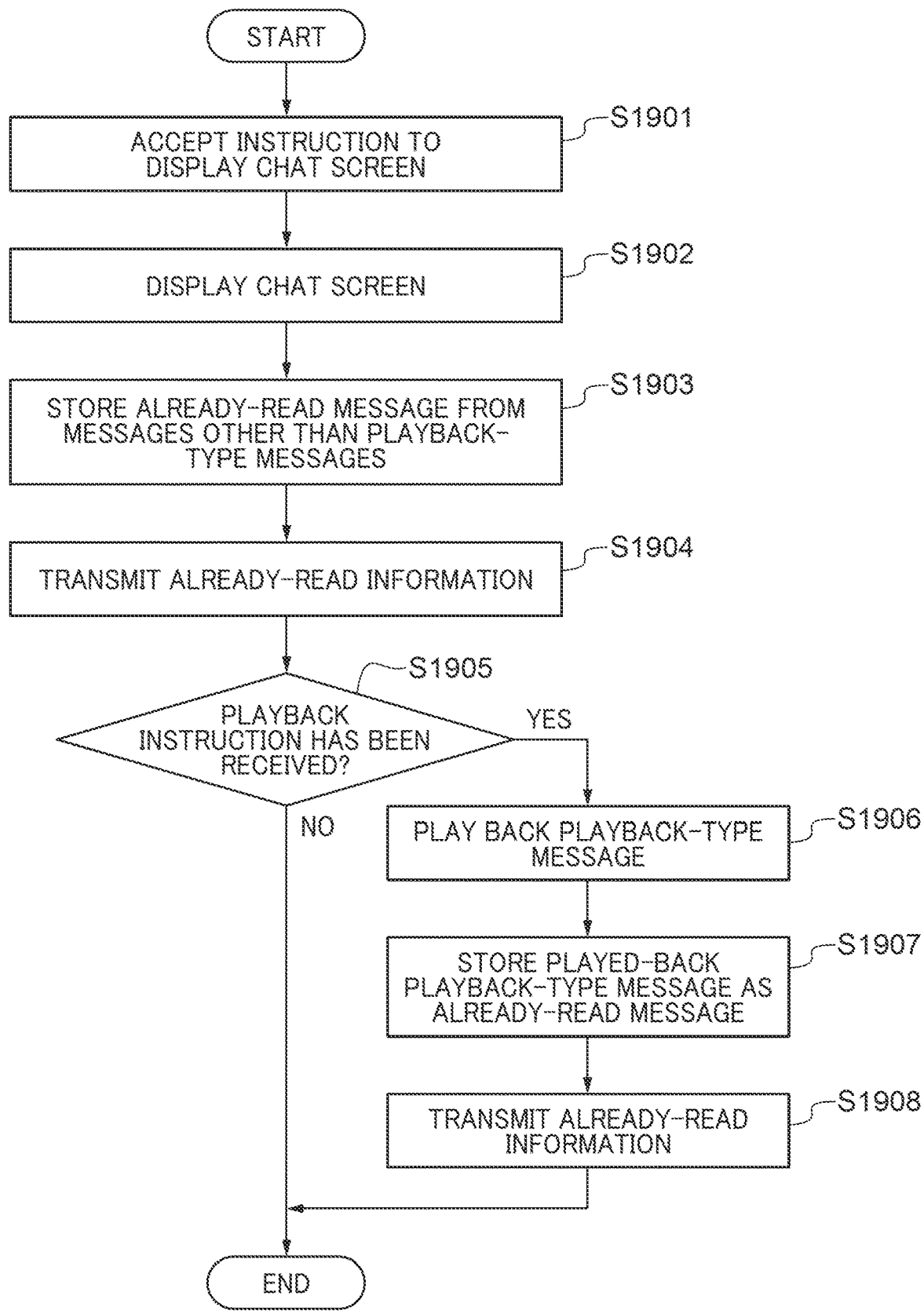
FIG. 19 is a flowchart that shows another procedure of the message display processing executed by the mobile terminal shown in FIG. 1.

FIG. 19 is a flowchart that shows another procedure of the message display processing performed in S404 of FIG. 4. It should be noted that the message display processing shown in FIG. 19 is a processing similar to the message display processing shown in FIG. 7B described above, and in particular, the contents that are different from the message display processing shown in FIG. 7B described above will be described below. Similar to the message display processing shown in FIG. 7B described above, the message display processing shown in FIG. 19 is also realized by the control unit 311 of the mobile terminal 102 executing a program stored in the storage unit 312.

Figure 20B:
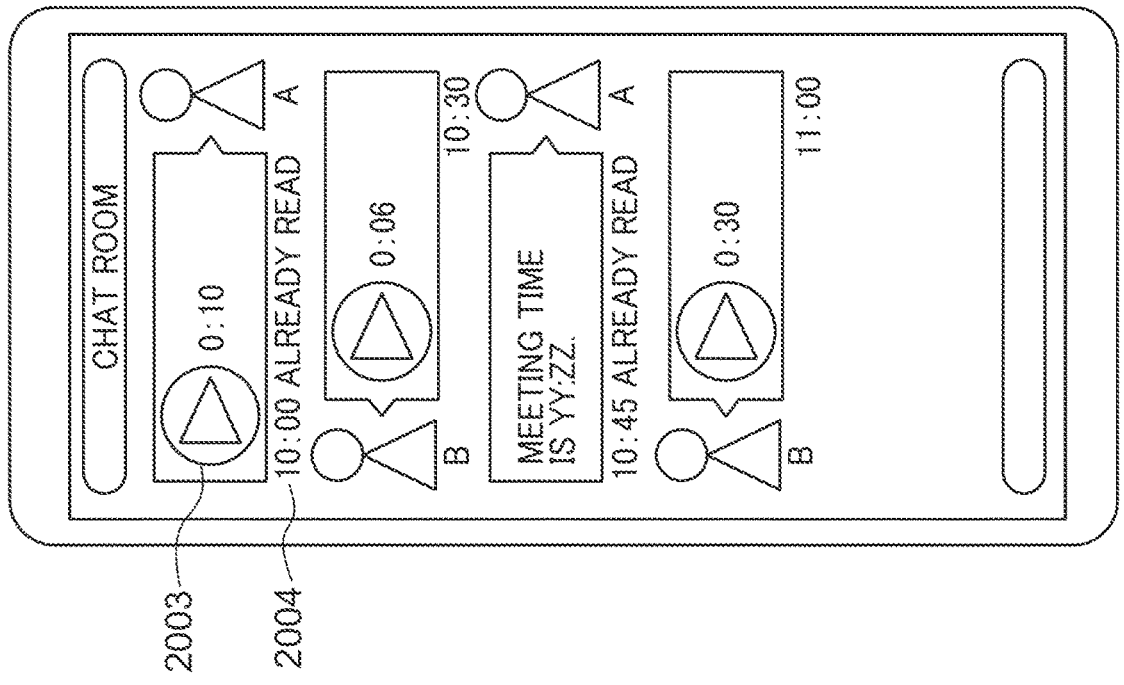
FIGS. 20A and 20B are diagrams that show an example of the chat screen displayed on the display unit of the mobile terminal on the sending side based on already-read information transmitted by the message display processing of FIG. 19.
Figure 20A:
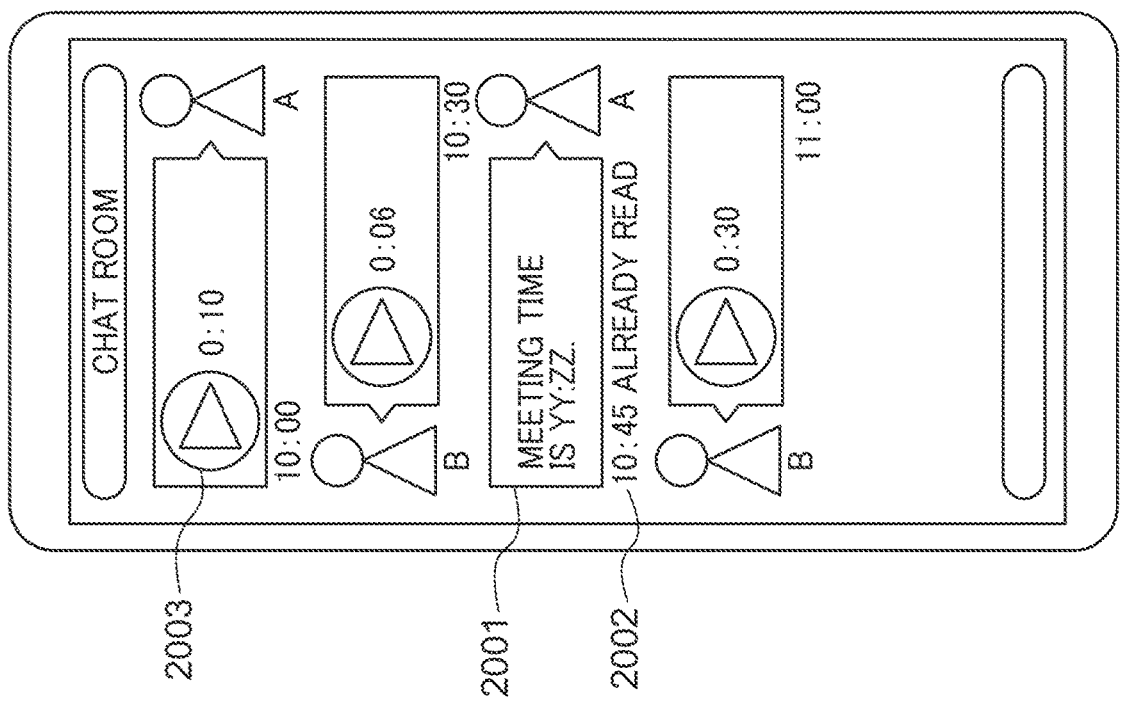

As shown in FIG. 19, the control unit 311 performs S1901 and S1902, which are the same processes as S711 and S712 described above. Next, the control unit 311 stores an already-read message from among messages other than playback-type messages (S1903). Specifically, the control unit 311 stores the latest message that has not been confirmed so far among the messages other than the playback-type messages as the already-read message. Next, the control unit 311 transmits information indicating the stored already-read message to the chat server 105 as the already-read information (S1904). The already-read information transmitted in S1904 is transmitted from the chat server 105 to the mobile terminal 101. On the chat screen displayed on the display unit 304 of the mobile terminal 101 that has received the already-read information, as shown in FIG. 20A, an already-read notification 2002 is displayed near a message 2001 other than the playback-type messages. It should be noted that no already-read notification is displayed near a playback button 2003 for a playback-type message that has not yet been played on the mobile terminal 102.

Next, the control unit 311 determines whether or not an instruction to play back a voice message has been received from the user (S1905). In the case of being determined in S1905 that the instruction to play back the voice message has not been received from the user, the display and playback control processing ends. On the other hand, in the case of being determined in S1905 that the instruction to play back the voice message has been received from the user, the display and playback control processing proceeds to S1906.

In S1906, the control unit 311 plays back the playback-type message corresponding to the pressed playback button. For example, in the case that the playback-type message corresponding to the pressed playback button is a voice message, the control unit 311 causes the speaker 316 to output the voice message corresponding to the pressed playback button. In addition, in the case that the playback-type message corresponding to the pressed playback button is a moving image message, the control unit 311 causes the speaker 316 to output the audio of the moving image message corresponding to the pressed playback button, and causes the display unit 314 to display the video of the moving image message corresponding to the pressed playback button. Next, the control unit 311 stores the playback-type message played back as the already-read message (S1907). Next, the control unit 311 transmits already-read information indicating the already-read message stored in S1907 to the chat server 105 (S1908), and then the message display processing shown in FIG. 19 ends.

The already-read information transmitted in S1908 is transmitted from the chat server 105 to the mobile terminal 101. On the chat screen displayed on the display unit 304 of the mobile terminal 101 that has received the already-read information, as shown in FIG. 20B, an already-read notification 2004 is displayed near a playback button 2003 corresponding to the playback-type message played back in S1906.

In this way, on the chat screen displayed on the display unit 304 of the mobile terminal 101, based on the already-read information transmitted when the mobile terminal 102 has played back the playback-type message, the already-read notification 2004 is displayed near the playback button 2003 corresponding to the playback-type message. As a result, the user A is able to know from this already-read notification that the content of the sent playback-type message has been conveyed to the user B.

Furthermore, in the preferred embodiment of the present invention, in the case that the mobile terminal 102 has played back the received playback-type message for a predetermined period of time or longer, the mobile terminal 102 may transmit already-played-back information indicating this playback-type message to the chat server 105.

Here, in the preferred embodiment described above, based on the fact that the playback of the playback-type message has started, it is determined that the playback-type message has been already played back. However, in the case that the user B issues an instruction to stop the playback of the playback-type message immediately after issuing an instruction to play back the playback-type message, even though the user B is not fully aware of the content of the playback-type message, the playback-type message will be treated as having been already played back.

In order to deal with this issue, in the preferred embodiment of the present invention, in the case that the received playback-type message has been played back for the predetermined period of time or longer, the already-played-back information indicating this playback-type message is transmitted to the chat server 105.

Figure 21:
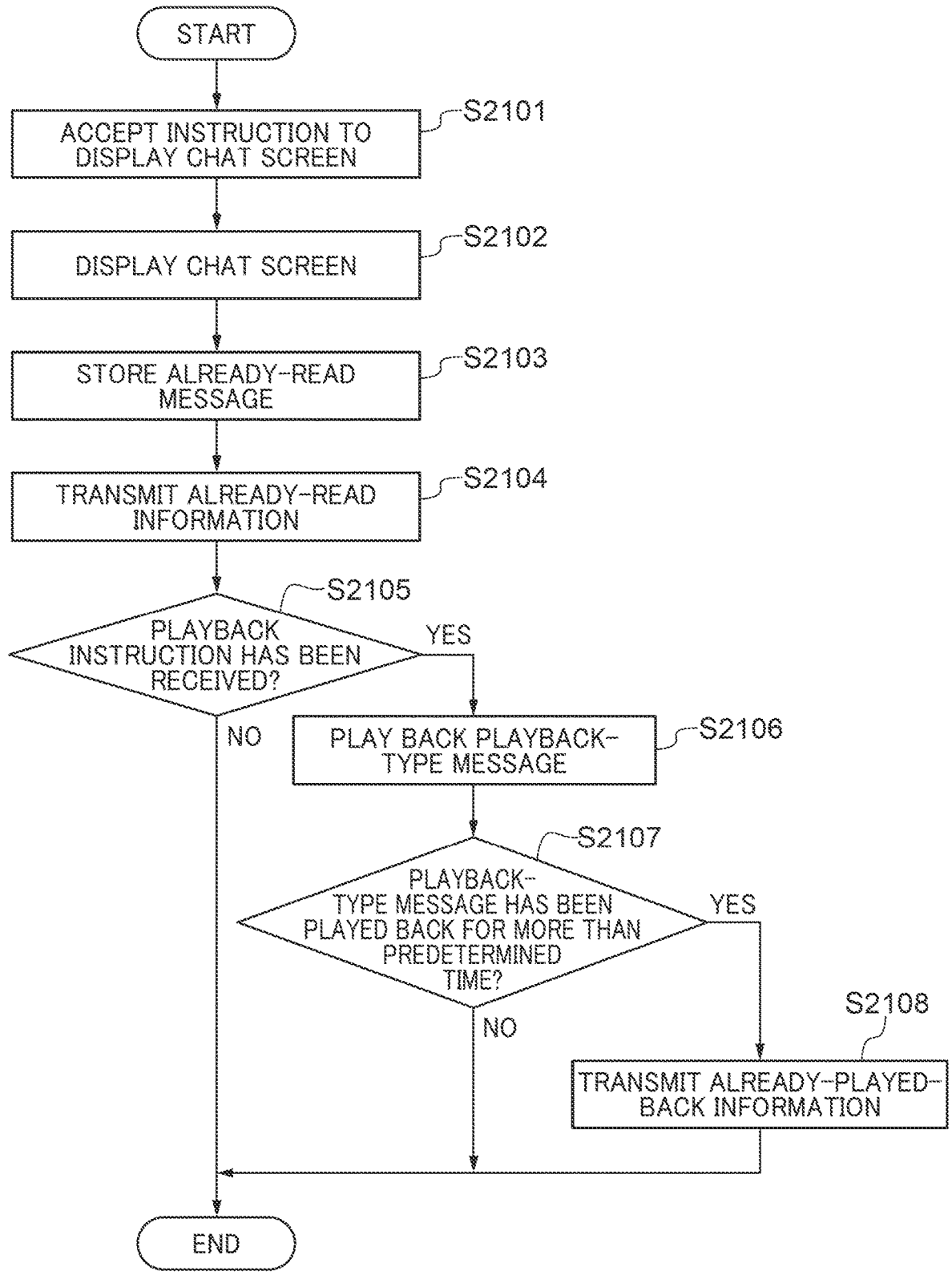
FIG. 21 is a flowchart that shows still another procedure of the display and playback control processing performed in S1004 of FIG. 10.

FIG. 21 is a flowchart that shows still another procedure of the display and playback control processing performed in S1004 of FIG. 10. It should be noted that the display and playback control processing shown in FIG. 21 is a processing similar to the display and playback control processing shown in FIG. 12 described above, and in particular, the contents that are different from the display and playback control processing shown in FIG. 12 described above will be described below. Similar to the display and playback control processing shown in FIG. 12, the display and playback control processing shown in FIG. 21 is also realized by the control unit 311 of the mobile terminal 102 executing a program stored in the storage unit 312.

As shown in FIG. 21, the control unit 311 performs S2101 to S2106, which are the same processes as S1201 to S1206 described above. Next, the control unit 311 determines whether or not the playback-type message corresponding to the pressed playback button has been played back for a predetermined period of time set in advance or longer (S2107). The predetermined period of time is, for example, 80% of the time of the message, 10 seconds, or the like. In the case of being determined in S2107 that the playback-type message corresponding to the pressed playback button has been played back for the predetermined period of time or longer, the control unit 311 transmits already-played-back information indicating the playback-type message played back to the chat server 105 (S2108). After that, the display and playback control processing shown in FIG. 21 ends. On the other hand, in the case of being determined in S2107 that the playback-type message corresponding to the pressed playback button has not been played back for the predetermined period of time or longer, the display and playback control processing shown in FIG. 21 ends without transmitting the already-played-back information indicating the playback-type message played back.

In the preferred embodiment described above, in the case that the received playback-type message has been played back for the predetermined period of time or longer, the already-played-back information indicating this playback-type message is transmitted to the chat server 105. As a result, it is possible to enhance the accuracy of the already-played-back notification to notify that the content of the playback-type message sent by the user A has been conveyed to the user B.

Furthermore, in the preferred embodiment of the present invention, in a group chat where three or more people chat, when all recipients have played back a playback-type message, an already-played-back notification may be displayed on the chat screen displayed on the terminal of the sender of the playback-type message.

Figure 22:
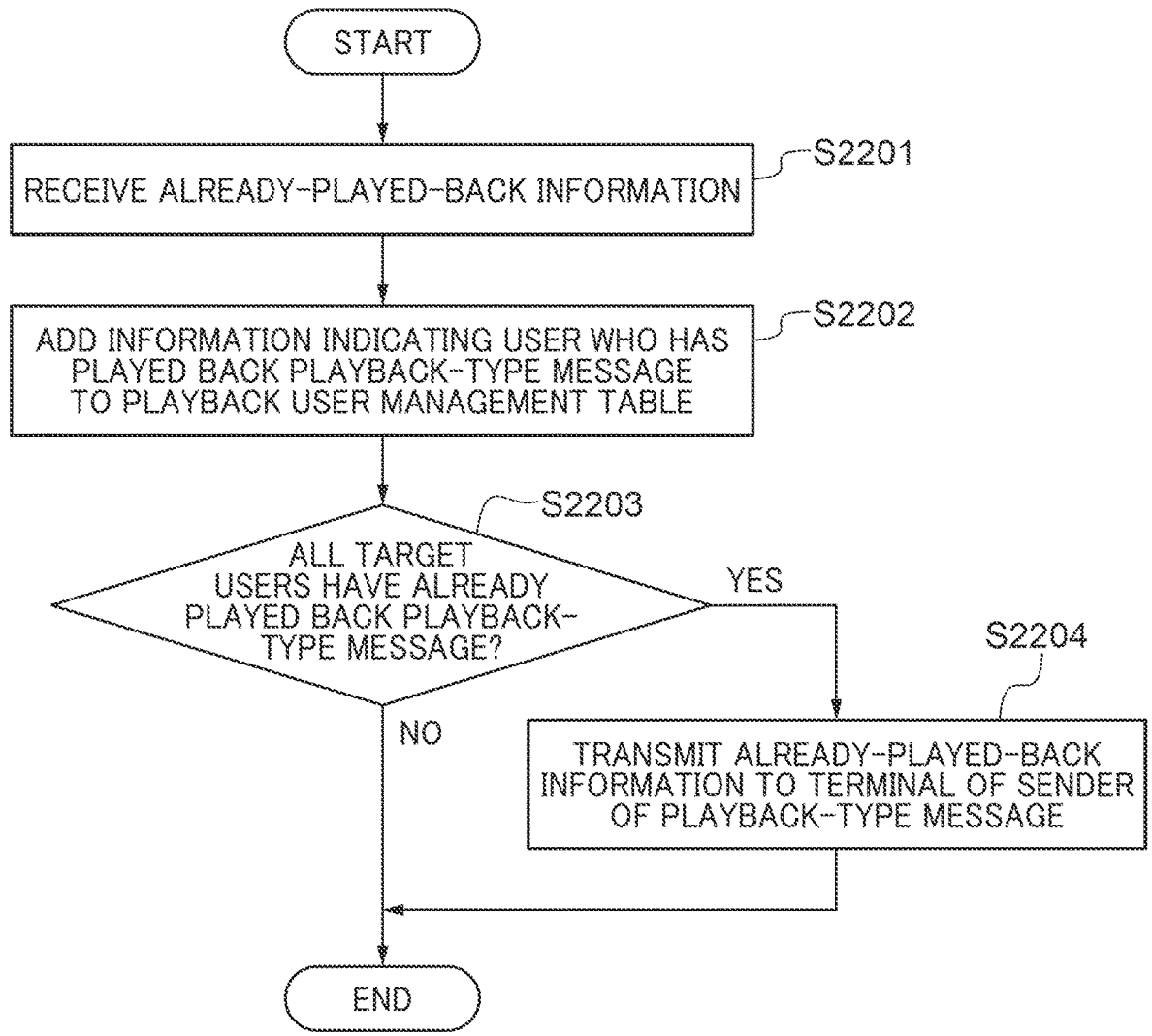
FIG. 22 is a flowchart that shows a procedure of an already-played-back information management processing performed by the chat server shown in FIG. 1.

FIG. 22 is a flowchart that shows a procedure of an already-played-back information management processing performed by the chat server 5 shown in FIG. 1. The already-played-back information management processing shown in FIG. 22 is realized by the control unit 201 of the chat server 105 executing a program stored in the storage unit 203. The already-played-back information management processing shown in FIG. 22 is executed when the chat server 105 executes the message management processing shown in FIG. 6 described above and transmits data of the received message to terminals of target users. The target users are users other than the sender of this message among the plurality of users registered in a chat room of the group chat. When the target user presses a playback button corresponding to this message on the chat screen displayed on the terminal, this message is played back, and already-played-back information indicating this message is transmitted to the chat server 105.

As shown in FIG. 22, the control unit 201 receives the already-played-back information from the terminal of the target user (S2201). This already-played-back information includes information indicating the playback-type message that has been played back, a chat room ID of the chat room being used, and information indicating the user who has played back this playback-type message. Next, based on the received already-played-back information, the control unit 201 adds the information indicating the user who has played back the playback-type message to a playback user management table 2300 shown in FIG. 23 stored in the storage unit 203 (S2202). In the playback user management table 2300, information regarding which playback-type message has been played back by which user is managed for each chat room. It should be noted that in FIG. 23, only information about a chat room A is shown as an example, but information about other chat rooms may also be shown.

Next, the control unit 201 determines whether or not all the target users have already played back the playback-type message (S2203). It should be noted that, as described above, the target users are users other than the sender of the playback-type message among the plurality of users registered in the chat room of the group chat. In S2203, in the case that the already-played-back information has not been received from the terminal of any target user, it is determined that any target user has not played back the above-mentioned playback-type message. In this case, the already-played-back information management processing ends. On the other hand, in the case that the already-played-back information has been received from the terminals of all the target users, it is determined that all the target users have already played back the above-mentioned playback-type message. In this case, the already-played-back information management processing proceeds to S2204.

In S2204, the control unit 201 transmits the already-played-back information to the terminal of the sender of the above-mentioned playback-type message. After that, the already-played-back information management processing ends.

In this way, when all the target users registered in the chat room of the group chat have played back the playback-type message, the already-played-back information of this playback-type message is transmitted to the terminal of the sender of this playback-type message. In other words, on the chat screen displayed on the terminal of the sender of this playback-type message, based on the fact that all the target users have played back the playback-type message, an already-played-back notification is displayed near this playback-type message. As a result, the user on the sending side of the playback-type message is able to know from this already-played-back notification in the group chat that the content of this playback-type message has been conveyed to all the users on the receiving side.

Furthermore, in the preferred embodiment of the present invention, in the group chat, the number of users who have played back a playback-type message may be displayed on the chat screen displayed on the terminal of the sender of the playback-type message.

Figure 24:
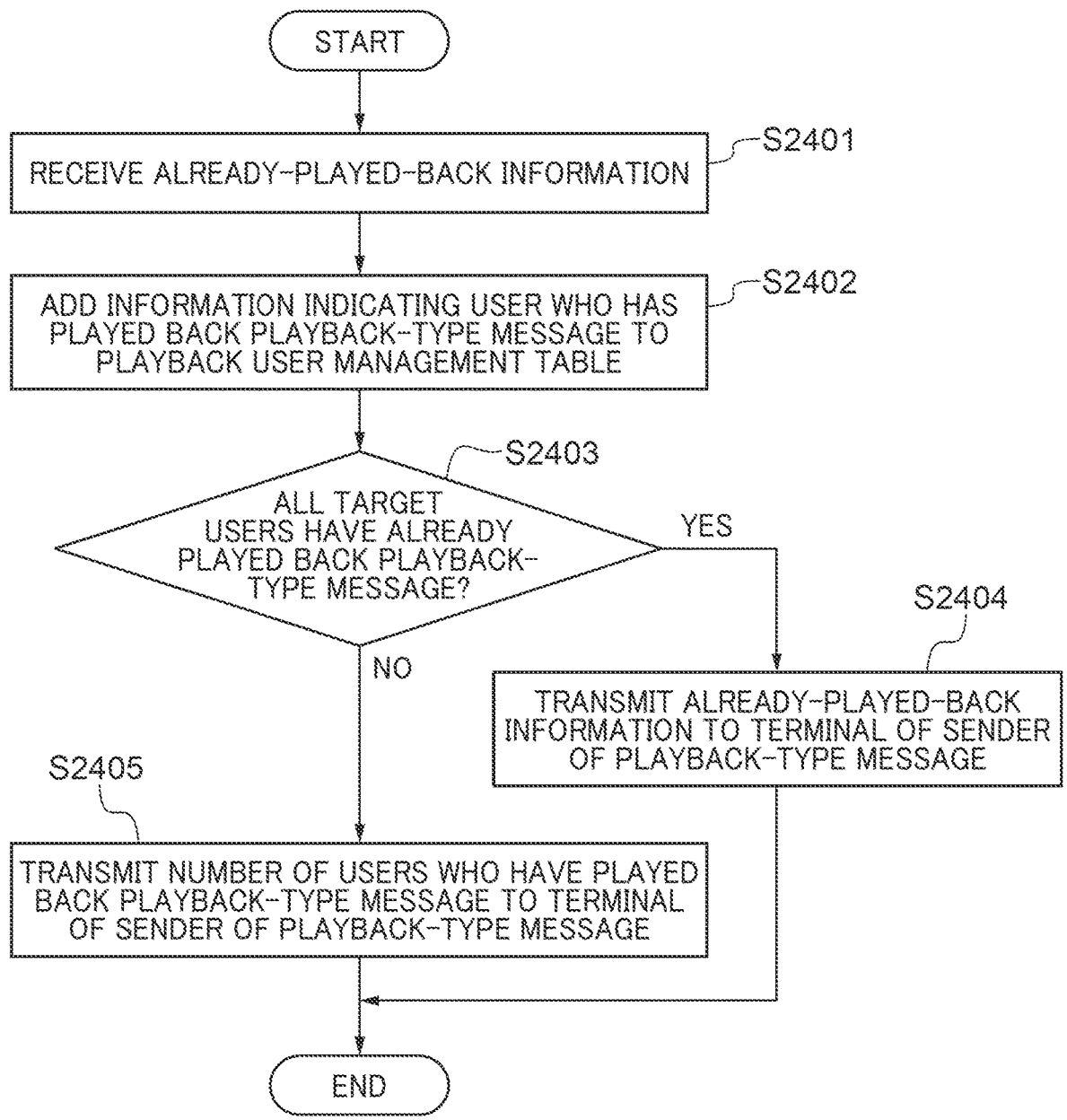
FIG. 24 is a flowchart that shows another procedure of the already-played-back information management processing of FIG. 22.

FIG. 24 is a flowchart that shows another procedure of the already-played-back information management processing of FIG. 22. It should be noted that the already-played-back information management processing shown in FIG. 24 is a processing similar to the already-played-back information management processing shown in FIG. 22 described above, and in particular, the contents that are different from the already-played-back information management processing shown in FIG. 22 described above will be described below. Similar to the already-played-back information management processing shown in FIG. 22, the already-played-back information management processing shown in FIG. 24 is also realized by the control unit 201 of the chat server 105 executing a program stored in the storage unit 203. Similar to the already-played-back information management processing shown in FIG. 22 described above, the already-played-back information management processing shown in FIG. 24 is also executed when the chat server 105 executes the message management processing shown in FIG. 6 described above and transmits data of the received message to the terminals of the target users.

Figure 25:
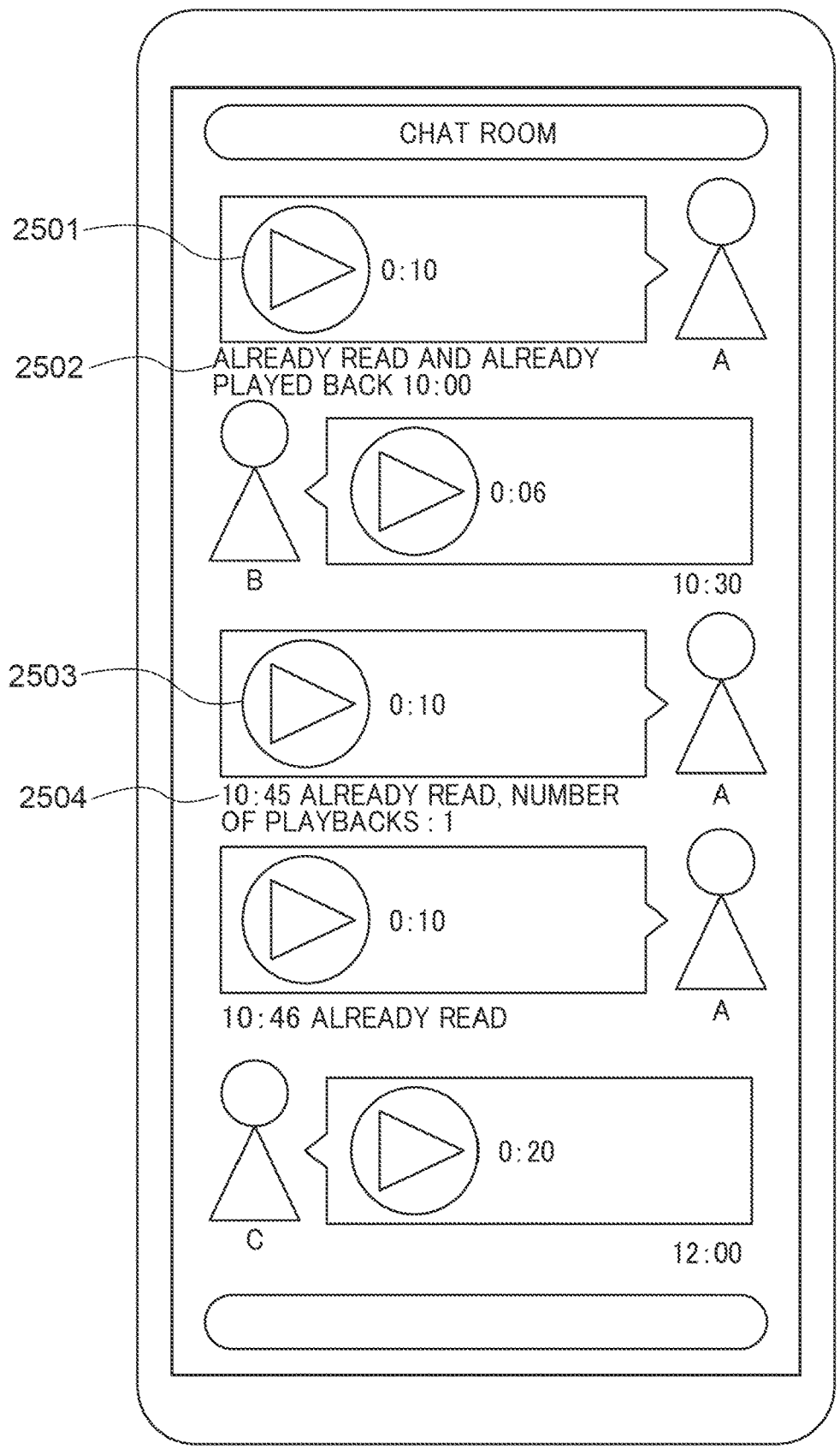
FIG. 25 is a diagram that shows an example of the chat screen displayed on the display unit of the mobile terminal on the sending side based on the number of users who have played back a playback-type message transmitted by the already-played-back information management processing of FIG. 24.

As shown in FIG. 24, the control unit 201 performs S2401 to S2403, which are the same processes as S2201 to S2203 described above. In the case of being determined in S2403 that all the target users have already played back the above-mentioned playback-type message, the already-played-back information management processing shown in FIG. 24 proceeds to S2404, which is the same process as S2204 described above. After that, the already-played-back information management processing shown in FIG. 24 ends. A chat screen is displayed on the terminal that has received the already-played-back information transmitted in S2404, for example, the display unit 304 of the mobile terminal 101. On this chat screen, for example, as shown in FIG. 25, an already-played-back notification 2502 is displayed near a playback button 2501 of the above-mentioned playback-type message.

In the case of being determined in S2403 that any target user has not played back the above-mentioned playback-type message, the already-played-back information management processing shown in FIG. 24 proceeds to S2405. In S2405, the control unit 201 transmits the number of users who have played back the above-mentioned playback-type message to the terminal of the sender of the above-mentioned playback-type message. After that, the already-played-back information management processing shown in FIG. 24 ends.

A chat screen is displayed on the terminal that has received the number of users who have played back the above-mentioned playback-type message transmitted in S2405, for example, the display unit 304 of the mobile terminal 101. On this chat screen, for example, as shown in FIG. 25, the number of playback users 2504 is displayed near a playback button 2503 of the above-mentioned playback-type message. As a result, the user on the sending side of the playback-type message is able to know that the content of the playback-type message has been conveyed to how many of the target users.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-030946, filed on Mar. 1, 2023, which is hereby incorporated by reference herein in its entirety.

What is claimed is:

1. A non-transitory computer-readable storage medium storing a program for causing an information processing apparatus to execute a process that transmits data of a message displayed on a terminal of a conversation partner who uses a chat room, the program comprising software code adapted to perform causing the information processing apparatus to display a chat screen of the chat room;
   causing the information processing apparatus to transmit data for playing back a playback-type message;
   causing the chat screen to display a first notification indicating that an object for issuing an instruction to play back the playback-type message has been displayed on the terminal of the conversation partner;
   when the playback-type message has been played back by the terminal of the conversation partner, causing the information processing apparatus to receive information indicating the playback-type message; and
   causing the chat screen to display a second notification, which indicates that the playback-type message has been played back, the second notification being displayed based on the information indicating the playback-type message and while the first notification is displayed, wherein
   in a case that there are two or more conversation partners, when the playback-type message has been played back by terminals of all the conversation partners, the second notification is displayed on the chat screen, and
   in a case that the playback-type message has not been played back by a terminal of any one of all the conversation partners, a number of users who have played back the playback-type message is displayed on the chat screen.

2. The non-transitory computer-readable storage medium according to claim 1, wherein the second notification is distinguishable from the first notification.

3. The non-transitory computer-readable storage medium according to claim 1, wherein the software code is adapted to further perform
   causing the information processing apparatus to receive predetermined information indicating that the object for issuing the instruction to play back the playback-type message has been displayed on the terminal of the conversation partner, and
   the first notification is displayed based on the predetermined information indicating that the object for issuing the instruction to play back the playback-type message has been displayed on the terminal of the conversation partner.

4. The non-transitory computer-readable storage medium according to claim 1, wherein the software code is adapted to further perform
   causing the chat screen to display the number of times the playback-type message has been played back by the terminal of the conversation partner.

5. A non-transitory computer-readable storage medium storing a program for causing an information processing apparatus to execute a process that receives data of a message transmitted from a terminal of a conversation partner who uses a chat room, the program comprising software code adapted to perform
   causing the information processing apparatus to display a chat screen of the chat room;
   causing the information processing apparatus to receive data for playing back a playback-type message; and
   causing the information processing apparatus to transmit predetermined information to the terminal of the conversation partner via a server that manages the chat room based on playback of the playback-type message,
   wherein the predetermined information is information, which indicates the playback-type message and is for causing the terminal of the conversation partner to display a predetermined notification indicating that the playback-type message has been played back,
   wherein the software code is adapted to further perform determining whether or not the playback-type message has been played back for a predetermined period of time or longer, and
   wherein when the playback-type message has been played back for the predetermined period of time or longer, the predetermined information is transmitted.

6. The non-transitory computer-readable storage medium according to claim 5, wherein the software code is adapted to further perform
   causing the chat screen to display the predetermined notification based on playback of the playback-type message.

7. The non-transitory computer-readable storage medium according to claim 5, wherein
   the predetermined information is transmitted in accordance with a start of playback of the playback-type message.

8. A control method for an information processing apparatus that transmits data of a message displayed on a terminal of a conversation partner who uses a chat room,
   the control method comprising:
   a step of causing a display of the information processing apparatus to display a chat screen of the chat room;
   a step of transmitting data for playing back a playback-type message;
   a step of causing the chat screen to display a first notification indicating that an object for issuing an instruction to play back the playback-type message has been displayed on the terminal of the conversation partner;
   a step of, when the playback-type message has been played back by the terminal of the conversation partner, receiving information indicating the playback-type message; and
   a step of causing the chat screen to display a second notification, which indicates that the playback-type message has been played back, the second notification being displayed based on the information indicating the playback-type message and while the first notification is displayed, wherein
   in a case that there are two or more conversation partners, when the playback-type message has been played back by terminals of all the conversation partners, the second notification is displayed on the chat screen, and
   in a case that the playback-type message has not been played back by a terminal of any one of all the conversation partners, a number of users who have played back the playback-type message is displayed on the chat screen.

9. A control method for an information processing apparatus that receives data of a message transmitted from a terminal of a conversation partner who uses a chat room,
   the control method comprising:
   a step of causing a display of the information processing apparatus to display a chat screen of the chat room;
   a step of receiving data for playing back a playback-type message; and
   a step of transmitting predetermined information to the terminal of the conversation partner via a server that manages the chat room based on playback of the playback-type message,
   wherein the predetermined information is information, which indicates the playback-type message and is for causing the terminal of the conversation partner to display a predetermined notification indicating that the playback-type message has been played back,
   wherein the method further comprises a step of determining whether or not the playback-type message has been played back for a predetermined period of time or longer, and
   wherein when the playback-type message has been played back for the predetermined period of time or longer, the predetermined information is transmitted.

10. An information processing apparatus that transmits data of a message displayed on a terminal of a conversation partner who uses a chat room, comprising:
    a display that displays a chat screen of the chat room;
    a network interface that transmits data for playing back a playback-type message; and
    a controller that causes the chat screen to display a first notification indicating that an object for issuing an instruction to play back the playback-type message has been displayed on the terminal of the conversation partner,
    wherein the network interface receives, when the playback-type message has been played back by the terminal of the conversation partner, information indicating the playback-type message, and
    wherein the controller causes the chat screen to display a second notification, which indicates that the playback-type message has been played back, the second notification being displayed based on the information indicating the playback-type message and while the first notification is displayed, wherein
    in a case that there are two or more conversation partners, when the playback-type message has been played back by terminals of all the conversation partners, the second notification is displayed on the chat screen, and
    in a case that the playback-type message has not been played back by a terminal of any one of all the conversation partners, a number of users who have played back the playback-type message is displayed on the chat screen.

11. An information processing apparatus that receives data of a message transmitted from a terminal of a conversation partner who uses a chat room, comprising:
    a display that displays a chat screen of the chat room; and
    a network interface that receives data for playing back a playback-type message,
    wherein the network interface transmits predetermined information to the terminal of the conversation partner via a server that manages the chat room based on playback of the playback-type message, wherein the predetermined information is information, which indicates the playback-type message and is for causing the terminal of the conversation partner to display a predetermined notification indicating that the playback-type message has been played back, wherein the information processing apparatus further comprises a controller to determine whether or not the playback-type message has been played back for a predetermined period of time or longer, and wherein when the playback-type message has been played back for the predetermined period of time or longer, the network interface transmits the predetermined information.

* * * * *